United States Patent
Xiao et al.

(10) Patent No.: US 12,088,215 B2
(45) Date of Patent: Sep. 10, 2024

(54) MODULATION STRATEGY SUITABLE FOR BALANCING LOSSES OF POWER SWITCHES IN BRIDGE ARM OF NEUTRAL POINT CLAMPED THREE LEVEL INVERTER AND IMPLEMENTATION METHOD

(71) Applicant: SOUTHEAST UNIVERSITY, Jiangsu (CN)

(72) Inventors: Huafeng Xiao, Jiangsu (CN); Xiaobiao Wang, Jiangsu (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/634,713

(22) Filed: Apr. 12, 2024

(65) Prior Publication Data

US 2024/0275303 A1  Aug. 15, 2024

Related U.S. Application Data

(63) Continuation of application No. PCT/CN2022/085008, filed on Apr. 2, 2022.

(30) Foreign Application Priority Data

Feb. 17, 2022 (CN) ......................... 202210147760.X

(51) Int. Cl.
*H02M 7/487* (2007.01)
*H02M 1/00* (2006.01)
(Continued)

(52) U.S. Cl.
CPC ......... *H02M 7/487* (2013.01); *H02M 1/0054* (2021.05); *H02M 1/088* (2013.01); *H02M 7/5387* (2013.01)

(58) Field of Classification Search
CPC .... H02M 7/487; H02M 1/0054; H02M 1/088; H02M 7/5387
See application file for complete search history.

(56) References Cited

U.S. PATENT DOCUMENTS 5,321,599 A * 6/1994 Tanamachi ............ H02M 7/487
                                                                        318/811
5,467,262 A * 11/1995 Nakata ...................... B60L 9/22
                                                                        363/41
(Continued)

FOREIGN PATENT DOCUMENTS

CN          105337524 A       2/2016
CN          111293914 A       6/2020

OTHER PUBLICATIONS

'Control Method of Loss Balancing for Three.level ANPC Inverter Based on SPWM' Zhang Wen-juan, Zhang Zhi-gang; "Power Electronics" vol. 50, issue 9; Sep. 20, 2016; pp. 2-7, 12 of the specification.

*Primary Examiner* — Yusef A Ahmed

(57) ABSTRACT

Disclosed are a modulation strategy suitable for balancing losses of power switches in a bridge arm of a neutral point clamped three level inverter and an implementation method. The modulation strategy includes that an operation type of an inverter is determined and a corresponding modulation style is selected on the basis of a power factor (PF) angle; a corresponding modulation interval is selected according to the modulation style; and drive signals for various power switches are outputted, to balance switching losses of inner and outer sides of a bridge arm. The modulation strategy of the present disclosure enables the rational utilization of freewheeling paths to achieve a balanced distribution of losses between the inner and outer power switches of the inverter bridge within the entire PF range, thereby prolonging the service life of power electronic devices.

1 Claim, 17 Drawing Sheets

(51) Int. Cl.
 *H02M 1/088* (2006.01)
 *H02M 7/5387* (2007.01)

(56) References Cited

U.S. PATENT DOCUMENTS

| | | | | | |
|---|---|---|---|---|---|
| 5,910,892 | A * | 6/1999 | Lyons | ............. | H02M 7/487 363/132 |
| 6,031,738 | A * | 2/2000 | Lipo | ............. | H02M 7/487 363/43 |
| 6,058,031 | A * | 5/2000 | Lyons | ............. | H02M 7/487 363/67 |
| 6,333,569 | B1 * | 12/2001 | Kim | ............. | H02M 7/219 307/31 |
| 8,564,994 | B2 * | 10/2013 | Capitaneanu | ...... | H02M 7/487 363/95 |
| 9,083,230 | B2 * | 7/2015 | Narimani | ............ | H02M 7/4837 |
| 9,520,800 | B2 * | 12/2016 | Tian | ............. | H02M 7/4833 |
| 9,859,816 | B2 * | 1/2018 | Chen | ............. | H02M 7/537 |
| 10,103,643 | B2 * | 10/2018 | Zhao | ............. | H02M 5/293 |
| 11,251,726 | B2 * | 2/2022 | Tang | ............. | B60L 50/51 |
| 2001/0015904 | A1 * | 8/2001 | Kimura | ............. | H02M 7/538 363/131 |
| 2012/0063184 | A1 * | 3/2012 | Mazumder | ......... | H02M 7/4807 363/98 |
| 2012/0300514 | A1 * | 11/2012 | Kolar | ............. | H02J 3/1857 363/39 |
| 2013/0272045 | A1 * | 10/2013 | Soeiro | ............. | H02M 7/487 363/131 |
| 2014/0016382 | A1 * | 1/2014 | Teo | ............. | H02M 7/5395 363/123 |
| 2014/0050000 | A1 * | 2/2014 | Teo | ............. | H02M 7/487 363/131 |
| 2014/0204636 | A1 * | 7/2014 | Liu | ............. | H02H 7/122 363/55 |
| 2014/0268940 | A1 * | 9/2014 | Viitanen | ............. | H02M 7/487 363/123 |
| 2015/0155712 | A1 * | 6/2015 | Mondal | ............. | H02J 3/1857 307/23 |
| 2015/0188362 | A1 * | 7/2015 | Mondal | ............. | H02J 9/062 307/52 |
| 2015/0200602 | A1 * | 7/2015 | Narimani | ............. | H02M 1/12 363/37 |
| 2017/0229871 | A1 * | 8/2017 | Liu | ............. | H02M 7/49 |
| 2017/0229977 | A1 * | 8/2017 | Mondal | ............. | H02M 3/04 |
| 2018/0062537 | A1 * | 3/2018 | Wang | ............. | H02M 1/08 |
| 2018/0097453 | A1 * | 4/2018 | Xu | ............. | H02P 27/06 |
| 2018/0152097 | A1 * | 5/2018 | Ying | ............. | H02M 7/487 |
| 2019/0113553 | A1 * | 4/2019 | Fu | ............. | G05B 6/02 |
| 2019/0260307 | A1 * | 8/2019 | Wang | ............. | H02M 1/08 |
| 2019/0334457 | A1 * | 10/2019 | Jeng | ............. | H02M 7/5395 |
| 2020/0389115 | A1 * | 12/2020 | Saha | ............. | H02M 7/501 |
| 2022/0037986 | A1 * | 2/2022 | Khananashvili | .... | H02M 1/0058 |
| 2022/0311330 | A1 * | 9/2022 | Lu | ............. | H02M 7/487 |
| 2022/0416679 | A1 * | 12/2022 | Wang | ............. | H02M 1/0058 |
| 2022/0416685 | A1 * | 12/2022 | Chen | ............. | H02M 7/483 |
| 2023/0133950 | A1 * | 5/2023 | Fu | ............. | H02M 1/0054 |
| 2023/0152364 | A1 * | 5/2023 | He | ............. | G01R 31/2608 324/762.08 |
| 2023/0223886 | A1 * | 7/2023 | Abarzadeh | ............. | H02P 27/14 318/504 |

* cited by examiner

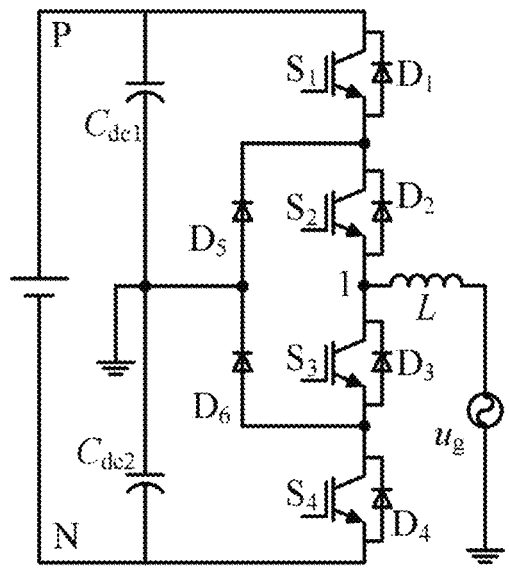
FIG. 1 (priort art)
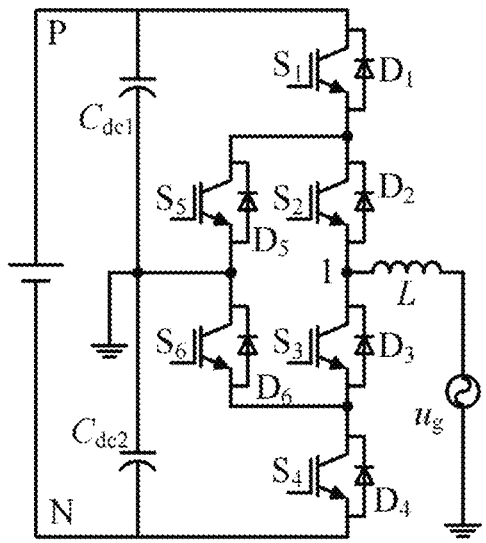
FIG. 2 (priort art)

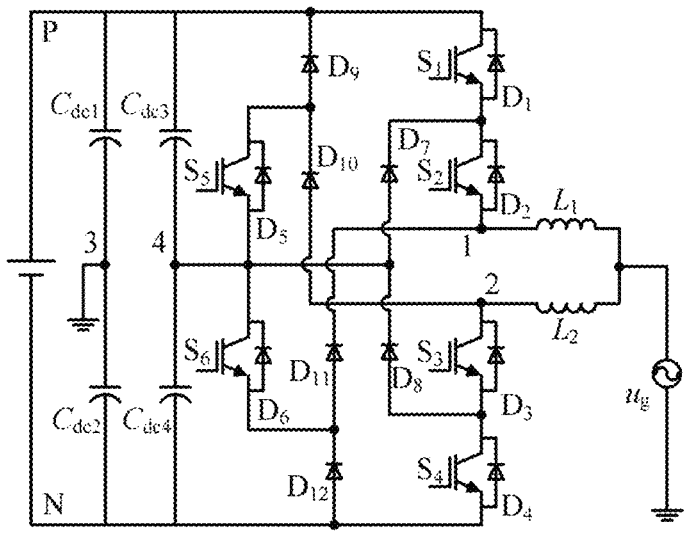
FIG. 3 (priort art)
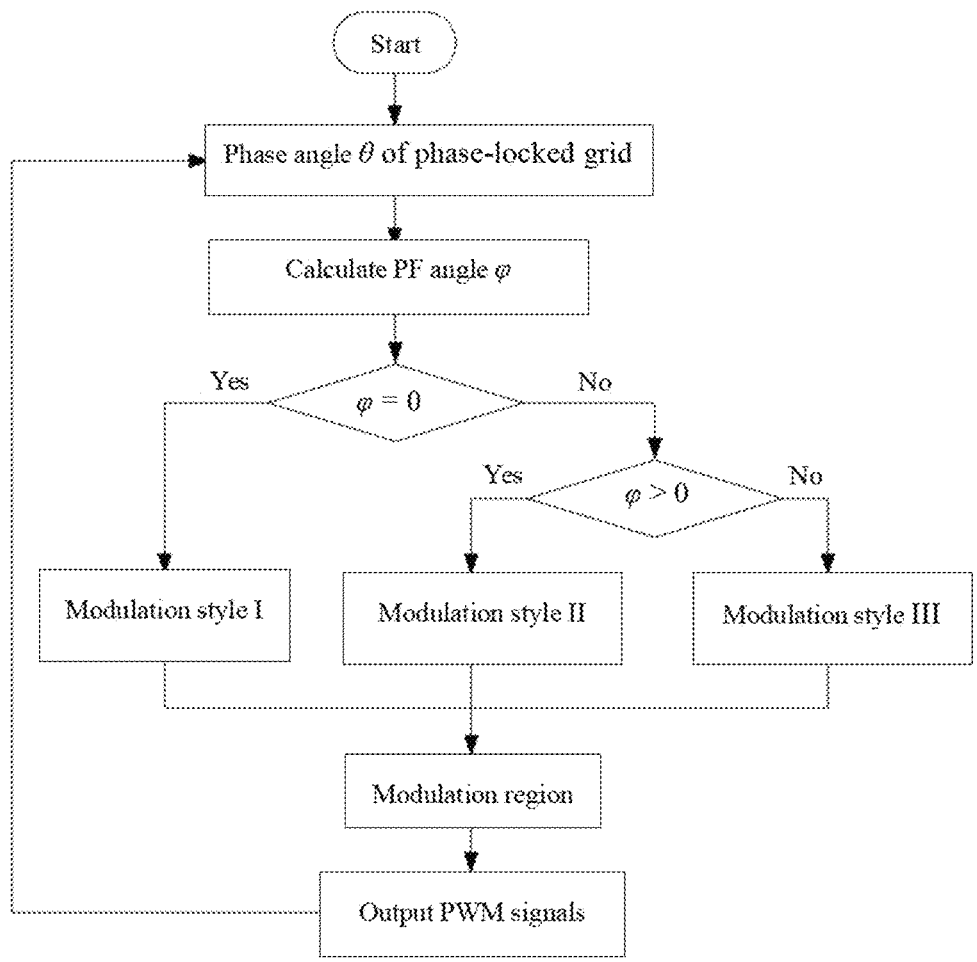
FIG. 4

MODULATION STRATEGY SUITABLE FOR BALANCING LOSSES OF POWER SWITCHES IN BRIDGE ARM OF NEUTRAL POINT CLAMPED THREE LEVEL INVERTER AND IMPLEMENTATION METHOD

CROSS-REFERENCE TO RELATED APPLICATIONS

This application is a continuation of PCT/CN2022/085008, filed Apr. 2, 2022 and claims priority of Chinese Patent Application No. 202210147760.X, filed on Feb. 17, 2022, the entire contents of which are incorporated herein by reference.

TECHNICAL FIELD

The present disclosure relates to the technical field of power electronic power conversion, in particular to a modulation strategy suitable for balancing losses of power switches in a bridge arm of a neutral point clamped three level inverter and an implementation method.

BACKGROUND

As a result of participation in the governance of global climate change and the need for energy security, the development and utilization of renewable energy has been an important means for energy transformation, and the development and utilization of wind energy occupies an important proportion in renewable energy. As onshore wind power undergoes continuous development, the focus of wind power development has begun to shift from onshore to offshore. With abundant offshore wind energy, a trend towards the large-scale development of offshore wind power will lead the wind power development in the future. A wind power inverter serves as an interface between an offshore wind turbine and a power grid, and its safe operation is of great significance to the safety and reliability of a wind turbine system and the power grid. Currently, the wind power inverter applied to offshore wind power system typically has a two-level structure, a three-level structure and a modular multilevel converter (MMC) structure, of which, MMC uses multiple voltage sub-modules, more complex in control, and the sub-modules can also have a two-level or three-level structure. Compared with a conventional two-level inverter, a three-level inverter has a lower output harmonic content and has been widely applied in offshore wind power conversion.

Another important form of renewable energy is the utilization of solar energy, and photovoltaic power generation, as the main form in solar energy development and utilization, has also been widely developed and concerned. With the construction of large-scale photovoltaic farms, there is a large demand for high-voltage high-power inverters. Similar to offshore wind power inverters, the three-level inverter is also applicable to photovoltaic power generation fields due to their advantages.

The intermittent nature of wind power and photovoltaic power generation results in the fluctuation of output power, which may impact the power grid. In response to this deficiency, a variety of energy storage technologies have gradually been applied. The use of energy storage technology can make the renewable energy with strong intermittent and fluctuation "adjustable and controllable", thereby promoting the utilization of new energy, and improving the operational stability of power system and power quality. The three-level inverter can improve the quality of output voltage waveform, which is conducive to the withstand voltage of power switching devices, and reduce the cost of switching devices, losses of power switching devices and inductance losses, thus improving the overall efficiency of the system, and therefore, the three-level inverter has a wide application prospect in the field of power storage inverters as well as in the field of variable frequency drive.

Among three-level inverters, the neutral point clamped three level inverter proposed by Japanese scholars Akira Nabae et al. in 1981 has the voltage stress of power device being half of the direct current (DC) input voltage, and is flexible in control and more widely used, the structure of which is shown in FIG. 1, with two capacitors constituting a capacitor bridge arm, and power switches constituting an inverter bridge arm. The losses of power switches are divided into conduction losses and switching losses. Limited to the single current freewheeling path in the neutral point clamped three level inverter, power switches on the outer side of the inverter bridge arm of the neutral point clamped three level inverter are mainly subject to switching losses, and power switches on the inner side are mainly subject to conduction losses, leading to a large difference in losses of power switches, i.e., the power losses between the power switches on the inner and outer sides of the bridge arm are not balanced. The power switches with higher losses have higher thermal stress, which adversely affects the design of an inverter heat dissipation system and the normal operation of the inverter, seriously restricting the service life of the inverter. For this reason, German scholars Thomas Bruckner et al. proposed an active neutral point clamped (A-NPC) three level inverter, as shown in FIG. 2. The A-NPC three level non-isolated inverter uses two power switches instead of clamping diodes in the neutral point clamped three level inverter, increasing the freedom degree of control and having a structural basis for optimizing the loss distribution. However, in the neutral point clamped three level inverter and A-NPC three level circuit structure, the direct series connection between the power switches and capacitors will cause short-circuit of the DC capacitor, which results in breakdown of the power switches, damaging the inverter, and ultimately affecting the normal operation of the system. A highly reliable split-inductor active neutral point clamped (SI-ANPC) three level inverter with non-unity power factor (NUPF) operation capability is invented (201911288710.8), as shown in FIG. 3, which is similar to the A-NPC three level circuit structure, and both of them have a structural basis of balanced loss distribution.

Scholars Ma Lin et al. proposed an adjustable losses distribution (ALD) modulation strategy. ALD uses two modulation waves, and uses different zero-state paths in different operation regions, to achieve a balanced loss distribution on the inner and outer sides of the bridge arm under a unity power factor (UPF). However, ALD has the problem of modulation wave saturation or over-modulation, which will adversely affects the operation of a circuit, and the situation under NUPF is not analyzed. Scholars Yang Jiao et al. proposed an only one zero (OOZ) state modulation strategy. OOZ uses only one set of zero-state paths, and balances the switching losses of the inner and outer sides of the bridge arm by adopting the zero-state paths in which two power switches are used in parallel to conduct a freewheeling current at the same time. The OOZ strategy is simple to implement while reducing the voltage and current spikes at the moments of switching the power switches. However, OOZ only changes the losses of the power switches on the inner side, and fails to change the losses of the power switches on the outer side, resulting in an unbalanced loss distribution.

SUMMARY

Aiming at the problem of unbalanced losses of power switches in a bridge arm of a three level inverter in the prior art, the present disclosure provides a modulation strategy for balancing loss distribution of power switches on inner and outer sides of a bridge arm and an implementation method. Different modulation styles are selected on the basis of the power factor (PF) angle; then, modulation intervals are chosen according to the modulation style and the PF angle; finally, drive signals of each switch are obtained in every modulation interval. The modulation strategy of the present disclosure enables the rational utilization of the freewheeling paths to achieve a balanced distribution of losses between the inner and outer power switches of the inverter bridge within the entire PF range, thereby improving the performance and prolonging the service life of inverters.

In order to realize the above objective, the present disclosure adopts the following technical solution: an implementation method for a modulation strategy suitable for balancing losses of power switches in a bridge arm of a neutral point clamped three level inverter includes the steps of:

S1. determining a PF angle $\Phi$;

S2. determining an operation type of an inverter according to the PF angle $\Phi$, and selecting a corresponding modulation style, the operation type including a UPF operation, a lagging PF operation, and a leading PF operation, corresponding to a modulation style I, a modulation style II, and a modulation style III, respectively;

S3. determining a corresponding modulation region according to the PF angle $\Phi$ obtained in step S1, the modulation style obtained in step S2, and a grid phase angle $\theta$, the modulation style I selectively corresponding to modulation regions I-A, I-B, I-C and I-D, the modulation style II selectively corresponding to modulation regions II-A, II-B, II-C, II-D, II-E and II-F, and the modulation style III selectively corresponding to modulation regions III-A, III-B, III-C, III-D, III-E, and III-F; and S4. outputting drive signals of various power switches according to the modulation regions to balance switching losses of inner and outer sides of a bridge arm.

In an improvement of the present disclosure, in step S2, in a case that the PF angle $\Phi$ is zero, the inverter is in the UPF operation, corresponding to the modulation style I; in a case that the PF angle $\Phi$ is greater than zero, the inverter is in the lagging PF operation, corresponding to the modulation style II; and in a case that the PF angle $\Phi$ is less than zero, the inverter is in the leading PF operation, corresponding to the modulation style III.

In an improvement of the present disclosure, in step S3, in the modulation style I, a corresponding modulation region is I-A in a case that the grid phase angle $\theta$ and the PF angle $\Phi$ meet $0 \leq \theta < \pi/2$, a corresponding modulation region is I-B in a case that $\pi/2 \leq \theta < \pi$, a corresponding modulation region is I-C in a case that $\pi \leq \theta < 3\pi/2$, and a corresponding modulation region is I-D in a case that $3\pi/2 \leq \theta < 2\pi$;

in the modulation style II, a corresponding modulation region is II-A in a case that the grid phase angle $\theta$ and the PF angle $\Phi$ meet $0 \leq \theta < \Phi$, a corresponding modulation region is II-B in a case that $\Phi \leq \theta < \Phi + \pi/2$, a corresponding modulation region is II-C in a case that $\Phi + \pi/2 \leq \theta < \pi$, a corresponding modulation region is II-D in a case that $\pi \leq \theta < \Phi + \pi$, a corresponding modulation region is II-E in a case that $\Phi + \pi \leq \theta < \Phi + 3\pi/2$, and a corresponding modulation region is II-F in a case that $\Phi + 3\pi/2 \leq \theta < 2\pi$; and in the modulation style III, a corresponding modulation region is 111-A in a case that the grid phase angle $\theta$ and the PF angle $\Phi$ meet $0 \leq \theta < \pi/2 - \Phi$, a corresponding modulation region is III-B in a case that $\pi/2 - \Phi \leq \theta < \pi - \Phi$, a corresponding modulation region is III-C in a case that $\pi - \Phi \leq \theta < \pi$, a corresponding modulation region is III-D in a case that $\pi \leq \theta < 3\pi/2 - \Phi$, a corresponding modulation region is III-E in a case that $3\pi/2 - \Phi \leq \theta < 2\pi - \Phi$, and a corresponding modulation region is III-F in a case that $2\pi - \Phi \leq \theta < 2\pi$.

In another improvement of the present disclosure, in step S4, in a case that the modulation style I is selected, in the region I-A, a power switch ($S_1$) operates at a high frequency according to a unipolar sinusoidal pulse width modulation (SPWM) mode, power switches ($S_2$, $S_6$) keep on, and power switches ($S_3$, $S_4$, $S_5$) keep off;

in the region I-B, a power switch ($S_2$) operates at a high frequency according to the unipolar SPWM mode, power switches ($S_1$, $S_6$) keep on, and power switches ($S_3$, $S_4$, $S_5$) keep off;

in the region I-C, a power switch ($S_4$) operates at a high frequency according to the unipolar SPWM mode, power switches ($S_3$, $S_5$) keep on, and power switches ($S_1$, $S_2$, $S_6$) keep off; and in the region I-D, a power switch ($S_3$) operates at a high frequency according to the unipolar SPWM mode, power switches ($S_4$, $S_5$) keep on, and power switches ($S_1$, $S_2$, $S_6$) keep off.

In another improvement of the present disclosure, in step S4, in a case that the modulation style II is selected, in the region II-A, a power switch ($S_5$) operates at a high frequency according to a unipolar SPWM mode, and the remaining power switches keep off;

in the region II-B, a power switch ($S_1$) operates at a high frequency according to the unipolar SPWM mode, power switches ($S_2$, $S_6$) keep on, and power switches ($S_3$, $S_4$, $S_5$) keep off;

in the region II-C, a power switch ($S_2$) operates at a high frequency according to the unipolar SPWM mode, power switches ($S_1$, $S_6$) keep on, and power switches ($S_3$, $S_4$, $S_5$) keep off;

in the region II-D, a power switch ($S_6$) operates at a high frequency according to the unipolar SPWM mode, and the remaining power switches keep off;

in the region II-E, a power switch ($S_4$) operates at a high frequency according to the unipolar SPWM mode, power switches ($S_3$, $S_5$) keep on, and power switches ($S_1$, $S_2$, $S_6$) keep off; and in the region II-F, a power switch ($S_3$) operates at a high frequency according to the unipolar SPWM mode, power switches ($S_4$, $S_5$) keep on, and power switches ($S_1$, $S_2$, $S_6$) keep off.

In yet another improvement of the present disclosure, in step S4, in a case that the modulation style III is selected, in the region III-A, a power switch ($S_2$) operates at a high frequency according to a unipolar SPWM mode, power switches ($S_1$, $S_6$) keep on, and power switches ($S_3$, $S_4$, $S_5$) keep off;

in the region III-B, a power switch ($S_1$) operates at a high frequency according to the unipolar SPWM mode, power switches ($S_2$, $S_6$) keep on, and power switches ($S_3$, $S_4$, $S_5$) keep off;

in the region III-C, a power switch ($S_5$) operates at a high frequency according to the unipolar SPWM mode, and the remaining power switches keep off;

in the region III-D, a power switch ($S_4$) operates at a high frequency according to the unipolar SPWM mode, power switches ($S_3$, $S_5$) keep on, and power switches ($S_1$, $S_2$, $S_6$) keep off;

in the region III-E, a power switch ($S_3$) operates at a high frequency according to the unipolar SPWM mode, power switches ($S_4$, $S_5$) keep on, and power switches ($S_1$, $S_2$, $S_6$) keep off; and in the region III-F, a power switch ($S_6$) operates at a high frequency according to the unipolar SPWM mode, and the remaining power switches keep off.

In a further improvement of the present disclosure, the drive signals of various power switches in step S4 are obtained by comparing a modulation wave $V_m$ with a carrier wave $V_c$ according to unipolar SPWM.

In a further improvement of the present disclosure, in step S1, an instruction, when given by a system as the PF angle Φ, is directly applied; and in a case that an instruction given by the system is a PF value, a calculation method for the PF angle Φ is Φ=arccos (PF).

Compared with the prior art, by reasonably constructing a grid-in current flow path, the modulation strategy provided by the present disclosure balances the loss distribution of power switches on the inner and outer sides of the bridge arm within the full PF range, improves the thermal stress of the power switches of the neutral point clamped three level inverter, and prolongs the life cycle of the inverter; and at the same time, the modulation strategy, easy for digital implementation, can be used for new product development as well as engineering reconstruction and performance enhancement to prolong the service life of power electronic devices, which is significant for offshore wind power, photovoltaic, energy storage, variable frequency drive and other applications.

BRIEF DESCRIPTION OF THE DRAWINGS

FIG. 1 is a circuit structure diagram of a neutral point clamped three level inverter.

FIG. 2 is a structural diagram of an A-NPC inverter.

FIG. 3 is a structural diagram of a highly reliable SI-ANPC inverter.

FIG. 4 is a flow chart of an implementation method for a modulation strategy suitable for balancing losses of power switches in a bridge arm of a neutral point clamped three level inverter according to the present disclosure.

Figure 5A:
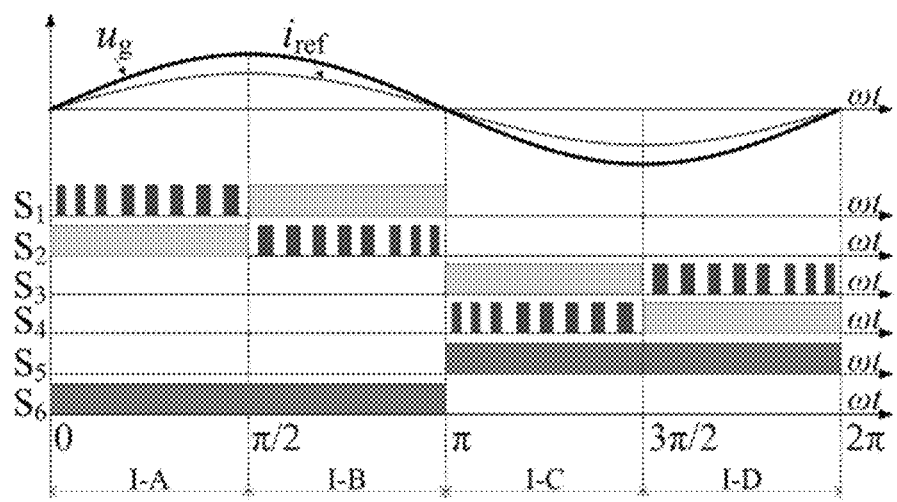
FIG. 5a is a schematic diagram of a modulation style I and modulation regions thereof.

Reference numerals and denotations in the above accompanying drawings: $U_{PN}$—DC input voltage; $C_{dc1}$ and $C_{dc2}$—DC capacitors; $S_1$-$S_6$—power switches; $D_1$-$D_{12}$—power diodes; $L_1$ and $L_2$—inductors; $V_m$—modulation wave; $V_c$—carrier wave; $i_{ref}$—grid-in current reference; $\Phi$—PF angle; $\theta$—grid phase angle; $u_{GS1}$ and $u_{GS2}$—drive signals of power switches $S_1$ and $S_2$; $i_{L1}$ and $i_{L2}$—currents of inductors; $u_g$—power grid and grid voltage; and $i_g$—grid-in current.

DETAILED DESCRIPTION

The present disclosure is further described below in combination with the accompanying drawings and specific examples, and it is to be understood that the following specific examples are intended merely to illustrate the present disclosure, rather than limiting the scope of the present disclosure.

Example 1

An implementation method for a modulation strategy suitable for balancing losses of power switches in a bridge arm of a neutral point clamped three level inverter, as shown in FIG. 4, specifically includes the following steps.

At step (1), a PF angle $\Phi$ is calculated.

At step (2), a UPF operation, a leading PF operation or a lagging PF operation is determined for an inverter according to the calculated PF angle $\Phi$, to select a corresponding modulation style.

Specifically, in a case that the PF angle $\Phi$ is zero, the inverter is in the UPF operation, and the modulation style I is selected; in a case that the PF angle $\Phi$ is greater than zero, the inverter is in the lagging PF operation, and the modulation style II is selected; and in a case that the PF angle $\Phi$ is less than zero, the inverter is in the leading PF operation, and the modulation style III is selected.

At step (3), a corresponding modulation region is selected according to the modulation style, a grid phase angle $\theta$ and $\Phi$.

Specifically, in the modulation style I, a corresponding modulation region is I-A in a case that $0 \leq \theta < \pi/2$; a corresponding modulation region is I-B in a case that $\pi/2 \leq \theta < \pi$; a corresponding modulation region is I-C in a case that $\pi \leq \theta < 3\pi/2$; and a corresponding modulation region is I-D in a case that $3\pi/2 \leq \theta < 2\pi$;

in the modulation style II, a corresponding modulation region is II-A in a case that $0 \leq \theta < \Phi$; a corresponding modulation region is II-B in a case that $\Phi \leq \theta < \Phi + \pi/2$; a corresponding modulation region is II-C in a case that $\Phi + \pi/2 \leq \theta < \pi$; a corresponding modulation region is II-D in a case that $\pi \leq \theta < \Phi + \pi$; a corresponding modulation region is II-E in a case that $\Phi + \pi \leq \theta < \Phi + 3\pi/2$; and a corresponding modulation region is II-F in a case that $\Phi + 3\pi/2 \leq \theta < 2\pi$; and in the modulation style III, a corresponding modulation region is III-A in a case that $0 \leq \theta < \pi/2 - \Phi$; a corresponding modulation region is III-B in a case that $\pi/2 - \Phi \leq \theta < \pi - \Phi$; a corresponding modulation region is III-C in a case that $\pi - \Phi \leq \theta < \pi$; a corresponding modulation region is III-D in a case that $\pi \leq \theta < 3\pi/2 - \Phi$; a corresponding modulation region is III-E in a case that $3\pi/2 - \Phi \leq \theta < 2\pi - \Phi$; and a corresponding modulation region is III-F in a case that $2\pi - \Phi \leq \theta < 2\pi$.

At step (4), according to the modulation region, unipolar SPWM drive signals of various power switches obtained by comparing a modulation wave $V_m$ with a carrier wave $V_c$ are outputted to balance switching losses of the inner and outer sides of the bridge arm.

Figure 5B:
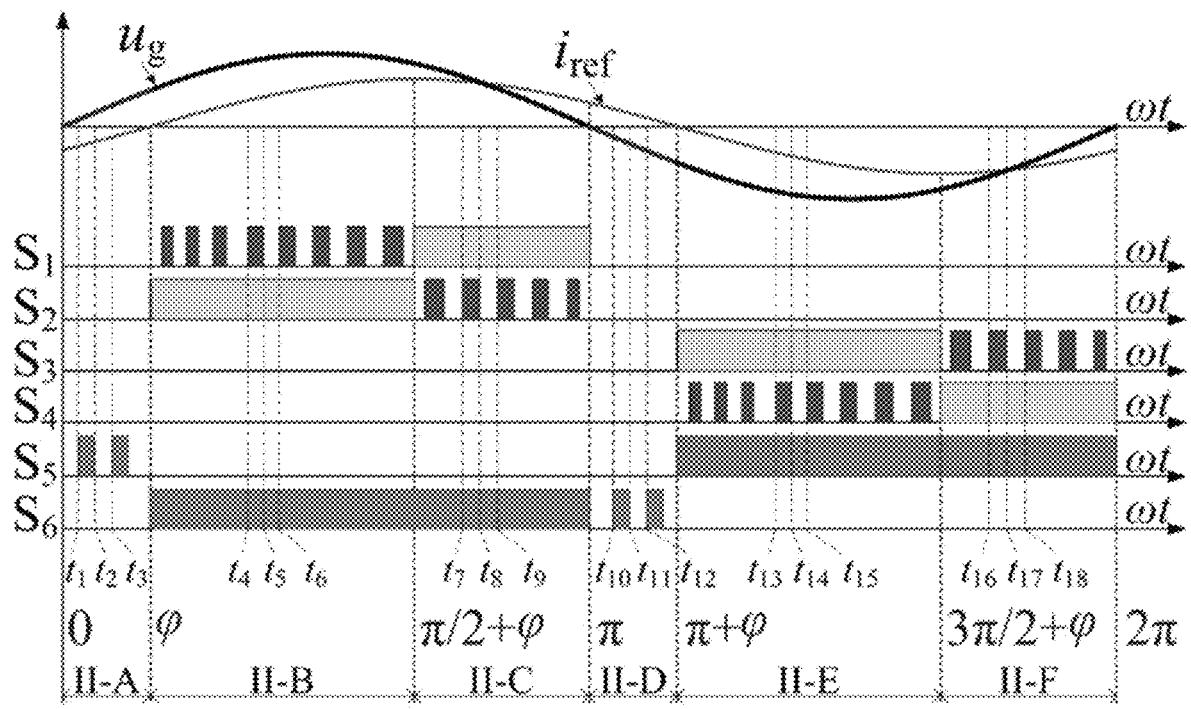
FIG. 5b is a schematic diagram of a modulation style II and modulation regions thereof.
Figure 5C:
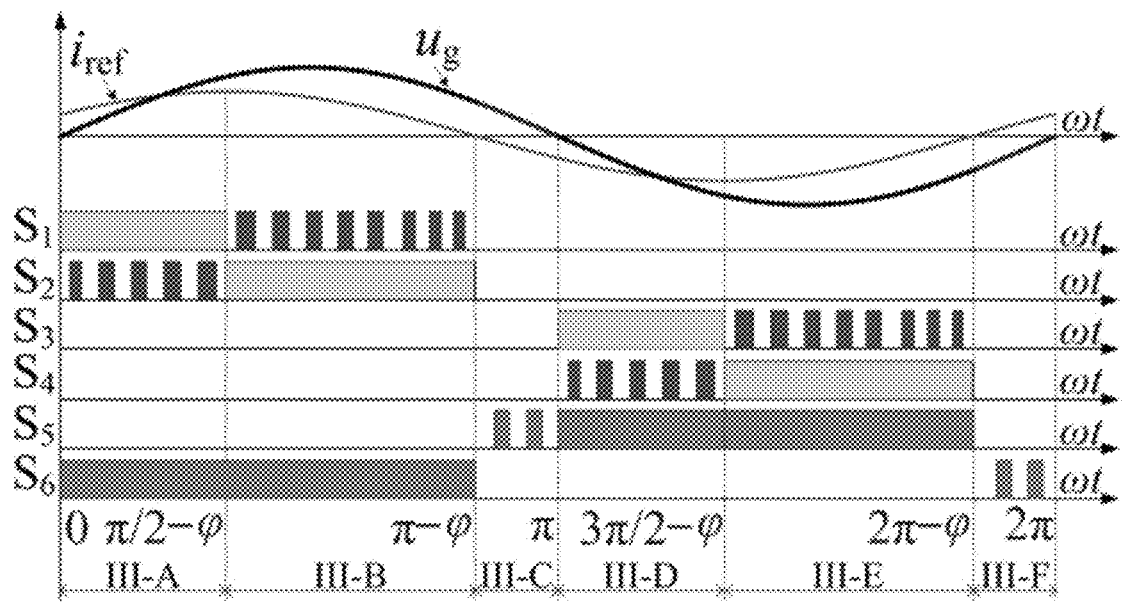
FIG. 5c is a schematic diagram of a modulation style III and modulation regions thereof.

FIGS. 5a-5c are schematic diagrams of modulation styles and modulation regions thereof based on a modulation strategy for balancing loss distribution of power switches in a highly reliable SI-ANPC inverter in FIG. 3 according to the example. FIG. 5a is a schematic diagram of a modulation style I and modulation regions thereof. As shown in FIG. 5a, in the modulation style I, strategies for generating drive signals from various power switches are as follows. In the region I-A, a power switch $S_1$ operates at a high frequency according to a unipolar SPWM mode, power switches $S_2$ and $S_6$ keep on, and power switches $S_3$, $S_4$ and $S_5$ keep off. In the region I-B, a power switch $S_2$ operates at a high frequency according to the unipolar SPWM mode, power switches $S_1$ and $S_6$ keep on, and power switches $S_3$, $S_4$ and $S_5$ keep off. In the region I-C, a power switch $S_4$ operates at a high frequency according to the unipolar SPWM mode, power switches $S_3$ and $S_5$ keep on, and power switches $S_1$, $S_2$ and $S_6$ keep off. In the region I-D, a power switch $S_3$ operates at a high frequency according to the unipolar SPWM mode, power switches $S_4$ and $S_5$ keep on, and power switches $S_1$, $S_2$ and $S_6$ keep off.

FIG. 5b is a schematic diagram of a modulation style II and modulation regions thereof. In the modulation style II, strategies for generating drive signals from various power switches are as follows. In the region II-A, a power switch $S_5$ operates at a high frequency according to a unipolar SPWM mode, and the remaining power switches keep off. In the region II-B, a power switch $S_1$ operates at a high frequency according to the unipolar SPWM mode, power switches $S_2$ and $S_6$ keep on, and power switches $S_3$, $S_4$ and $S_5$ keep off. In the region II-C, a power switch $S_2$ operates at a high frequency according to the unipolar SPWM mode, power switches $S_1$ and $S_6$ keep on, and power switches $S_3$, $S_4$ and $S_5$ keep off. In the region II-D, a power switch $S_6$ operates at a high frequency according to the unipolar SPWM mode, and the remaining power switches keep off. In the region II-E, a power switch $S_4$ operates at a high frequency according to the unipolar SPWM mode, power switches $S_3$ and $S_5$ keep on, and power switches $S_1$, $S_2$ and $S_6$ keep off. In the region II-F, a power switch $S_3$ operates at a high frequency according to the unipolar SPWM mode, power switches $S_4$ and $S_5$ keep on, and power switches $S_1$, $S_2$ and $S_6$ keep off.

FIG. 5c is a schematic diagram of a modulation style III and modulation regions thereof. In the modulation style III, strategies for generating drive signals from various power switches are as follows. In the region III-A, a power switch $S_2$ operates at a high frequency according to a unipolar SPWM mode, power switches $S_1$ and $S_6$ keep on, and power switches $S_3$, $S_4$ and $S_5$ keep off. In the region III-B, a power switch $S_1$ operates at a high frequency according to the unipolar SPWM mode, power switches $S_2$ and $S_6$ keep on, and power switches $S_3$, $S_4$ and $S_5$ keep off. In the region III-C, a power switch $S_5$ operates at a high frequency according to the unipolar SPWM mode, and the remaining power switches keep off. In the region III-D, a power switch $S_4$ operates at a high frequency according to the unipolar SPWM mode, power switches $S_3$ and $S_5$ keep on, and power switches $S_1$, $S_2$ and $S_6$ keep off. In the region III-E, a power switch $S_3$ operates at a high frequency according to the unipolar SPWM mode, power switches $S_4$ and $S_5$ keep on, and power switches $S_1$, $S_2$ and $S_6$ keep off. In the region III-F, a power switch $S_6$ operates at a high frequency according to the unipolar SPWM mode, and the remaining power switches keep off.

Figure 6A:
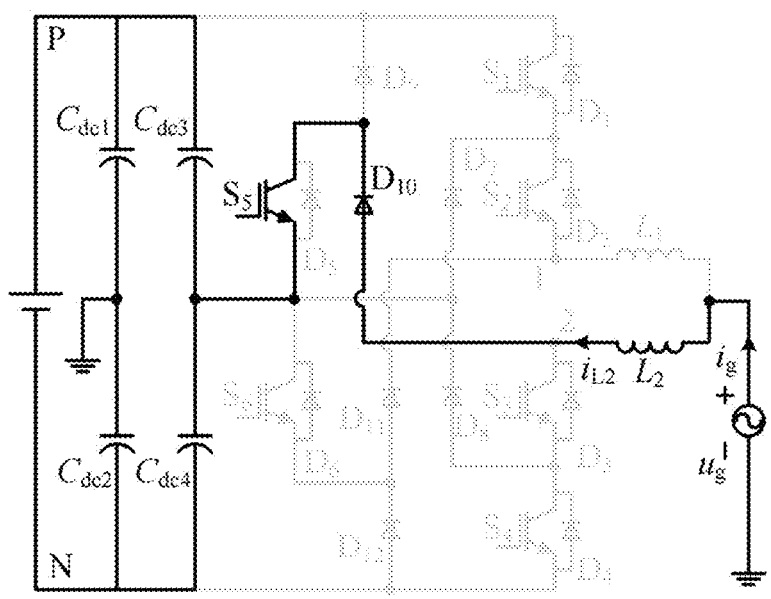
FIG. 6a is an equivalent circuit of an inverter working mode in the modulation style II from $t_1$ to $t_2$ in FIG. 5b.
Figure 6B:
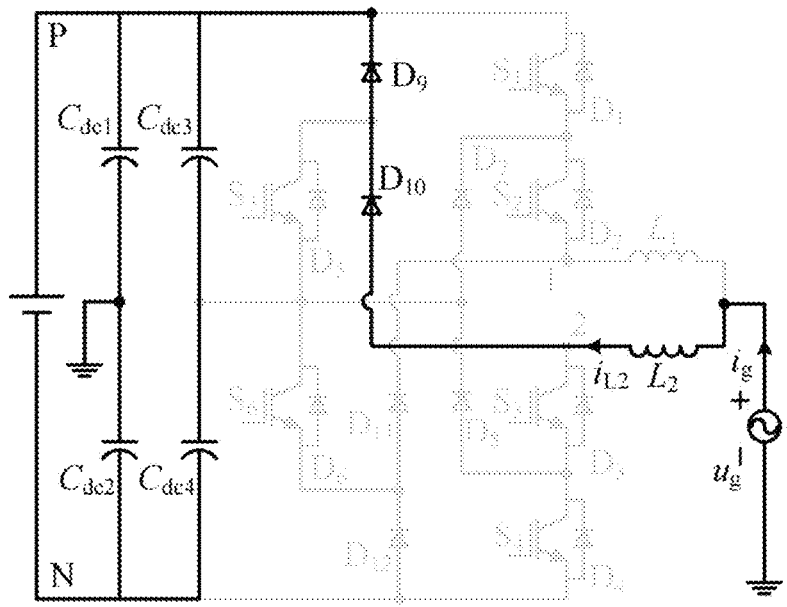
FIG. 6b is an equivalent circuit of an inverter working mode in the modulation style II from $t_2$ to $t_3$ in FIG. 5b.
Figure 6C:
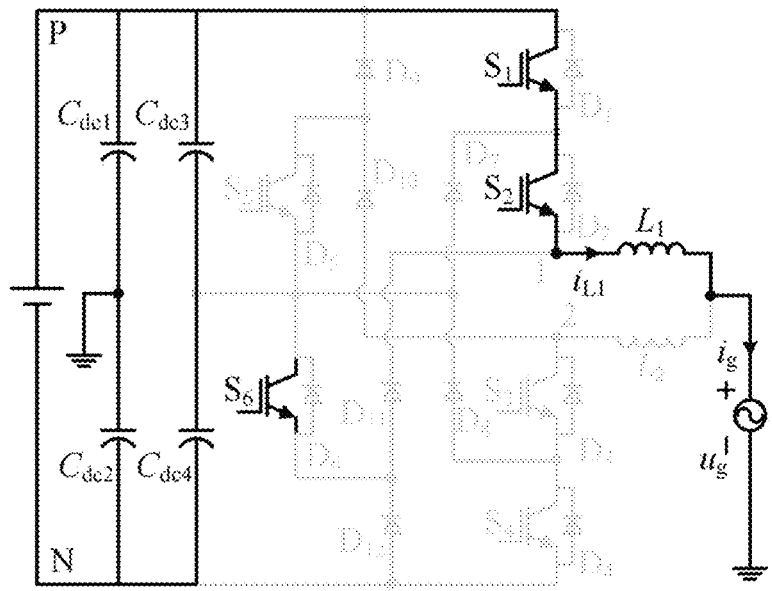
FIG. 6c is an equivalent circuit of an inverter working mode in the modulation style II from $t_4$ to $t_5$ in FIG. 5b.
Figure 6D:
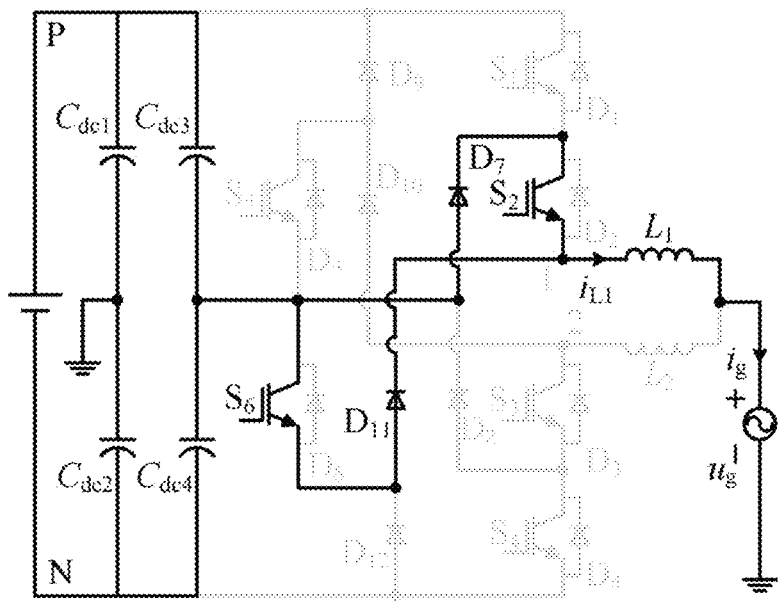
FIG. 6d is an equivalent circuit of an inverter working mode in the modulation style II from $t_5$ to $t_6$ in FIG. 5b.
Figure 6E:
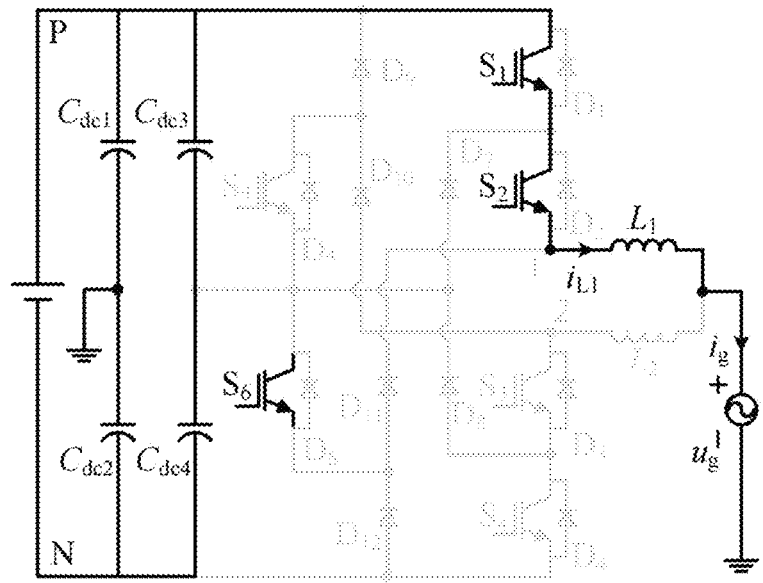
FIG. 6e is an equivalent circuit of an inverter working mode in the modulation style II from $t_7$ to $t_8$ in FIG. 5b.
Figure 6F:
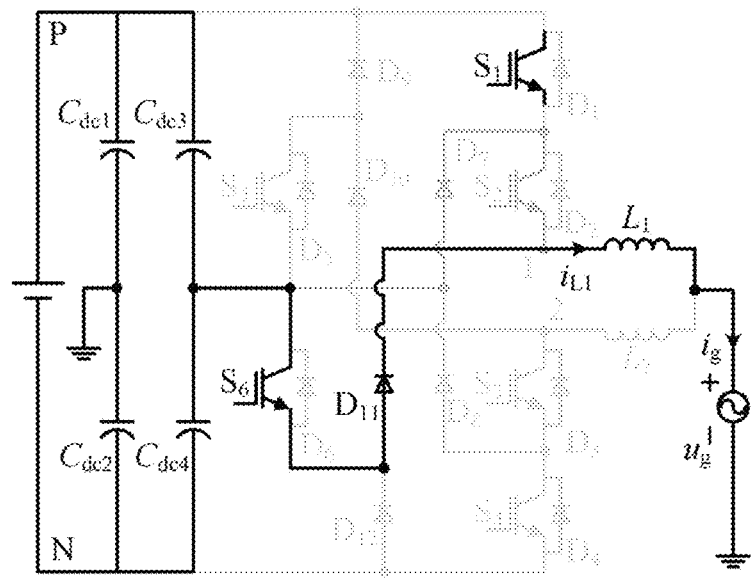
FIG. 6f is an equivalent circuit of an inverter working mode in the modulation style II from $t_8$ to $t_9$ in FIG. 5b.
Figure 6G:
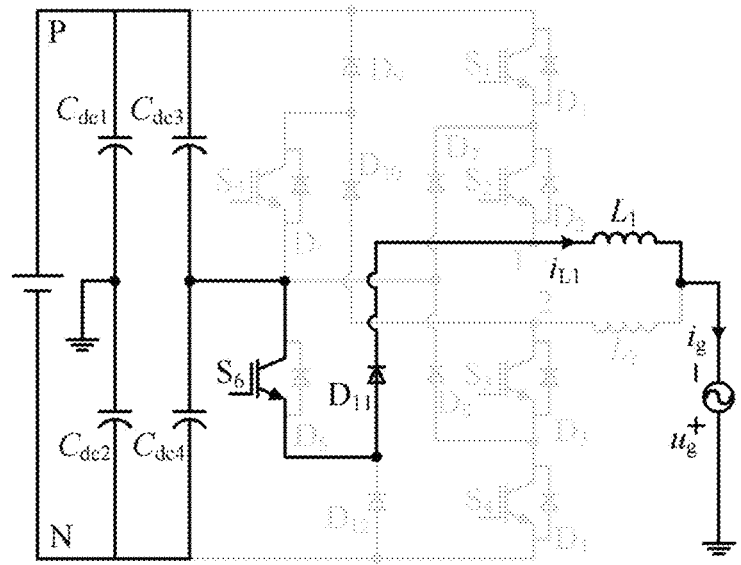
FIG. 6g is an equivalent circuit of an inverter working mode in the modulation style II from $t_{10}$ to $t_{11}$ in FIG. 5b.
Figure 6H:
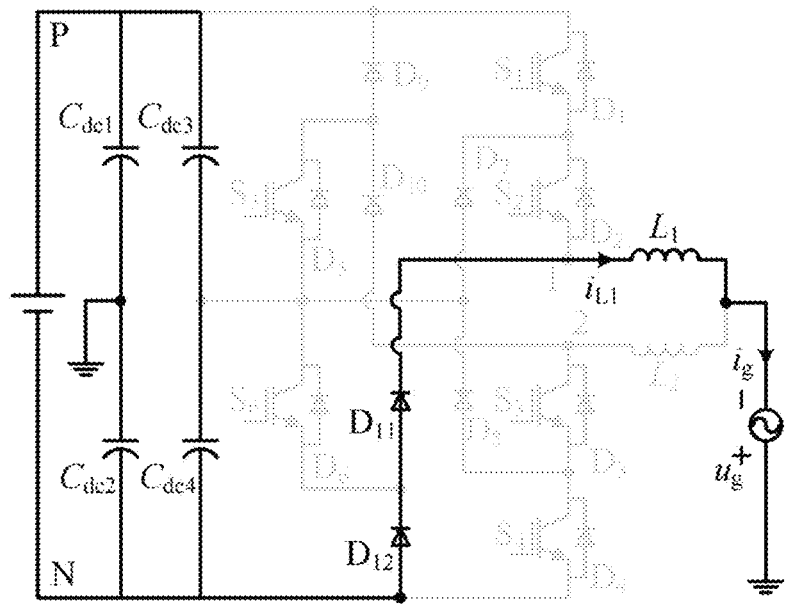
FIG. 6h is an equivalent circuit of an inverter working mode in the modulation style II from $t_{11}$ to $t_{12}$ in FIG. 5b.
Figure 6I:
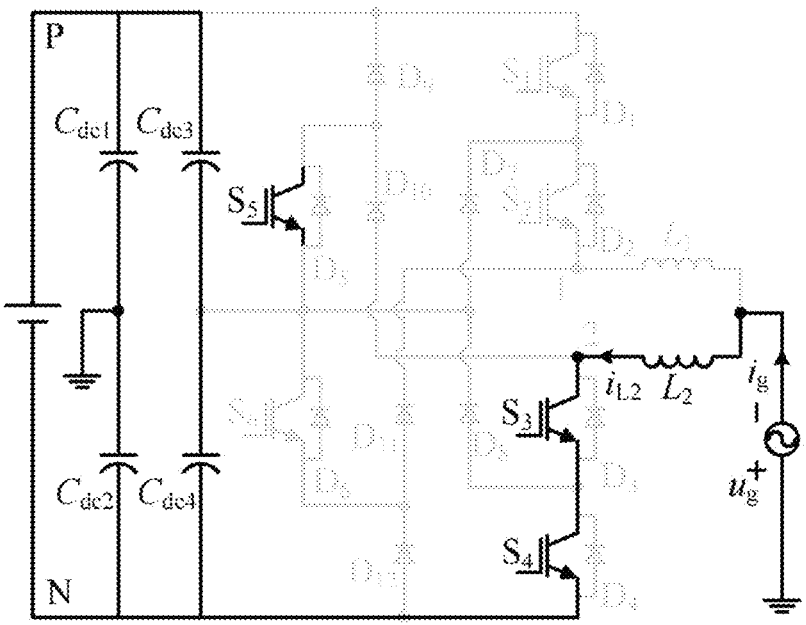
FIG. 6i is an equivalent circuit of an inverter working mode in the modulation style II from $t_{13}$ to $t_{14}$ in FIG. 5b.
Figure 6J:
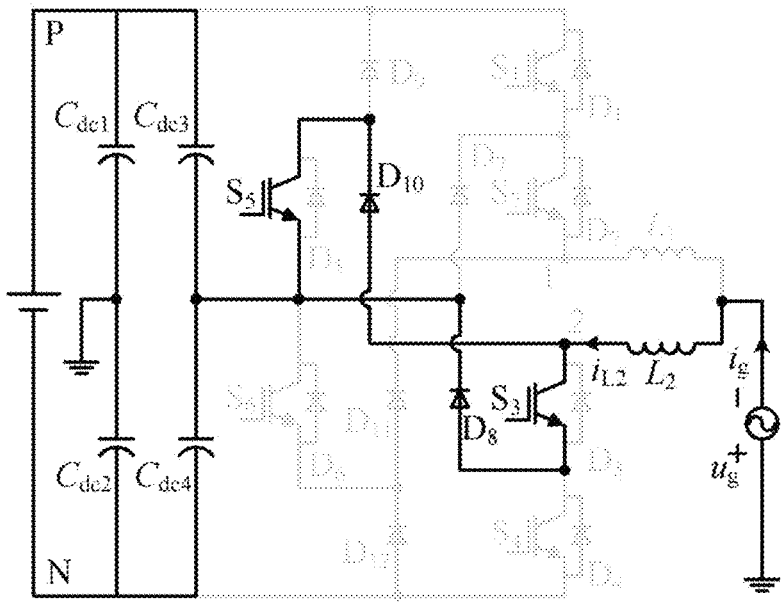
FIG. 6j is an equivalent circuit of an inverter working mode in the modulation style II from $t_{14}$ to $t_{15}$ in FIG. 5b.
Figure 6K:
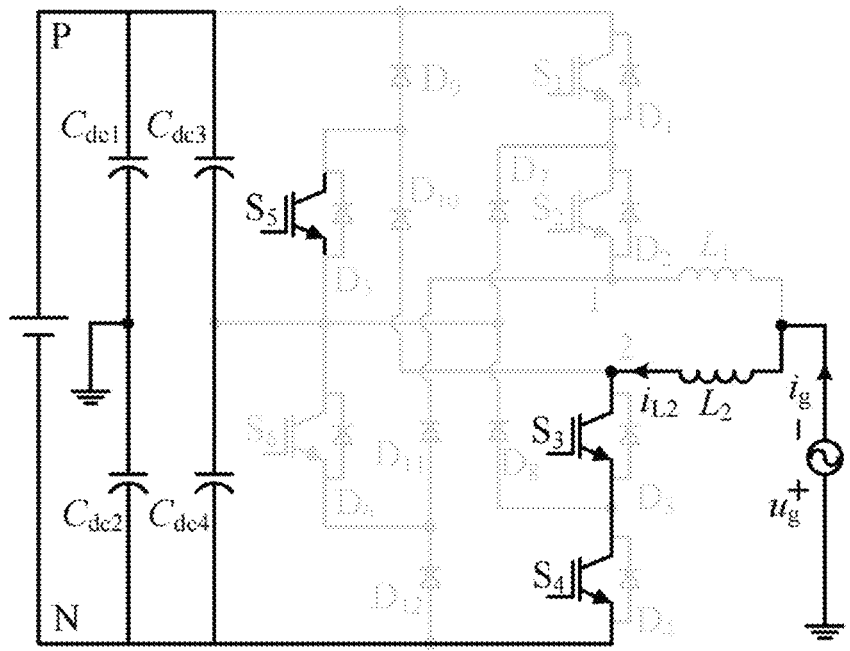
FIG. 6k is an equivalent circuit of an inverter working mode in the modulation style II from $t_{16}$ to $t_{17}$ in FIG. 5b.
Figure 6L:
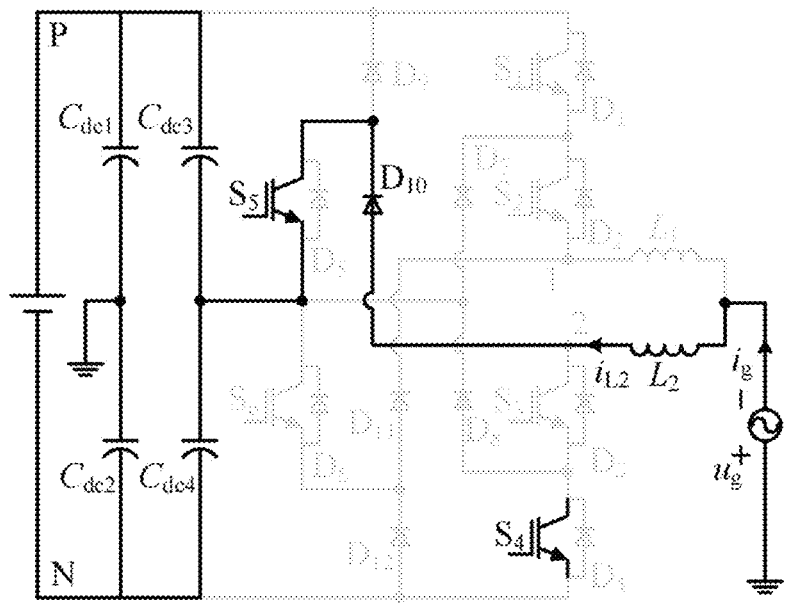
FIG. 6l is an equivalent circuit of an inverter working mode in the modulation style II from $t_{17}$ to $t_{18}$ in FIG. 5b.

FIGS. 6a-6l are working mode diagrams of a switching frequency scale in a case that the modulation strategy of the present disclosure is applied to an inverter in FIG. 3. FIGS. 6a-6f are schematic diagrams of working modes in a positive half-cycle of a grid voltage in a modulation style II shown in FIG. 5b. FIG. 6a is a schematic diagram of a mode 1 ($t_1$-$t_2$); FIG. 6b is a schematic diagram of a mode 2 ($t_2$-$t_3$); FIG. 6c is a schematic diagram of a mode 3 ($t_4$-$t_5$); FIG. 6d is a schematic diagram of a mode 4 ($t_5$-$t_6$); FIG. 6e is a schematic diagram of a mode 5 ($t_7$-$t_8$); and FIG. 6f is a schematic diagram of a mode 6 ($t_8$-$t_9$). FIGS. 6g-6l are schematic diagrams of working modes in a negative half-cycle of the grid voltage. FIG. 6g is a schematic diagram of a mode 7 ($t_{10}$-$t_{11}$); FIG. 6h is a schematic diagram of a mode 8 ($t_{11}$-$t_{12}$); FIG. 6i is a schematic diagram of a mode 9 ($t_{13}$-$t_{14}$); FIG. 6j is a schematic diagram of a mode 10 ($t_{14}$-$t_{15}$); FIG. 6k is a schematic diagram of a mode 11 ($t_{16}$-$t_{17}$); and FIG. 6l is a schematic diagram of a mode 12 ($t_{17}$-$t_{18}$).

Based on the modulation strategy of the present disclosure, equivalent circuits of the inverter at the switching frequency scale in various modulation styles are the same, and the difference only lies in the sequence in which the different working modes appear, so that only the equivalent circuit in the modulation style II is provided, and the operating principles of the inverter in the rest of the modulation styles are analyzed similarly. For easy analysis, assuming that: 1) all power switches and diodes are ideal devices without considering the switching time and on-state voltage drop; 2) all inductors and capacitors are ideal devices, and $C_{dc1}$=$C_{dc2}$, $L_1$=$L_2$; and 3) the inverter operates in a lagging PF mode, and a grid-in current $i_g$ lags behind a grid voltage $u_g$. An introduction is given below by taking the equivalent circuit in the modulation style II as an example.

In the modulation region II-A: mode 1 ($t_1$-$t_2$): as shown in FIG. 6a, a grid voltage and a grid-in current are in anti-phase at this time, with the grid voltage in a positive half-cycle and the grid-in current in a negative half-cycle; a power switch $S_5$ is in the on-state, and the remaining power switches are in the off-state; and an inductor $L_1$ has no current flowing, and a current in an inductor $L_2$ flows through the power switch $S_5$ for freewheeling. Mode 2 ($t_2$-$t_3$): as shown in FIG. 6b, a grid voltage is in a positive half-cycle while a grid-in current is in a negative half-cycle; all power switches are in the off-state; and an inductor $L_1$ has no current flowing, and a current from an inductor $L_2$ flows through a power diode $D_9$ and a power diode $D_{10}$ into a power grid, with the current decreasing gradually.

In the modulation region II-B: mode 3 ($t_4$-$t_6$): as shown in FIG. 6c, a grid voltage and a grid-in current are in in-phase, with both in a positive half-cycle; power switches $S_1$, $S_2$ and $S_6$ are in the on-state, and the grid-in current flows through the power switch $S_1$, a second power switch $S_2$ and an inductor $L_1$ into a power grid; and the power switch $S_6$ is in the on-state, but without current flowing. Mode 4 ($t_6$-$t_6$): as shown in FIG. 6d, both a grid voltage and a grid-in current are in a positive half-cycle; a power switch $S_1$ is in the off-state, and power switches $S_2$ and $S_6$ are in the on-state; a voltage at two ends of the power switch $S_1$ is clamped to half of a DC input voltage; and a current from an inductor $L_1$ is in the freewheeling state and flows through two branches, the first branch including the power switches $S_2$ and a power diode $D_7$ in series, and the second branch including the power switches $S_6$ and a power diode $D_{11}$.

In the modulation region II-C: mode 5 ($t_7$-$t_8$): as shown in FIG. 6e, both a grid voltage and a grid-in current are in in-phase; power switches $S_1$, $S_2$ and $S_6$ are in the on-state, the grid-in current flows through the power switch $S_1$, a second power switch $S_2$ and an inductor $L_1$ into a power grid; and the power switch $S_6$ is in the on-state, but without current flowing. Mode 6 ($t_8$-$t_9$): as shown in FIG. 6f, both a grid voltage and a grid-in current are in a positive half-cycle; a power switch $S_2$ is in the off-state, and power switches $S_1$ and $S_6$ are in the on-state; a voltage at two ends of the power switch $S_2$ is clamped to half of a DC input voltage; and a current from an inductor $L_1$ is in the freewheeling state, and a freewheeling branch includes the power switch $S_6$ and a power diode $D_{11}$.

In the modulation region II-D: mode 7 ($t_{10}$-$t_{11}$): as shown in FIG. 6g, a grid voltage and a grid-in current are in anti-phase, with the grid voltage in a negative half-cycle and the grid-in current in a positive half-cycle; a power switch $S_6$ is in the on-state, and the remaining power switches are in the off-state; and a current from an inductor $L_1$ flows through the power switch $S_6$ for freewheeling, and an inductor $L_2$ has no current flowing. Mode 8 ($t_{11}$-$t_{12}$): as shown in FIG. 6h, a grid voltage is in a negative half-cycle while a grid-in current is in a positive half-cycle; and all power switches in a circuit are in the off-state; a current from an inductor $L_1$ flows through a power diode $D_{11}$ and a power diode $D_{12}$ into a power grid, with the current decreasing gradually, and an inductor $L_2$ still has no current flowing.

In the modulation region II-E: mode 9 ($t_{13}$-$t_{14}$): as shown in FIG. 6i, a grid voltage and a grid-in current are in in-phase, with both in a negative half-cycle; power switches $S_3$, $S_4$ and $S_5$ are in the on-state, and the grid-in current flows through the power switch $S_3$, a second power switch $S_4$ and an inductor $L_2$ into a power grid; and the power switch $S_5$ is in the on-state, but without current flowing. Mode 10 ($t_{14}$-$t_{15}$) as shown in FIG. 6j, both a grid voltage and a grid-in current are in a negative half-cycle; a power switch $S_4$ is in the off-state, and power switches $S_3$ and $S_5$ are in the on-state; a voltage at two ends of the power switch $S_4$ is clamped to half of a DC input voltage; a current from an inductor $L_2$ is in the freewheeling state and flows through two branches, the first branch including the power switch $S_3$ and a power diode $D_8$ in series, and the second branch including the power switch $S_5$ and a power diode $D_{10}$.

In the modulation region II-F: mode 11 ($t_{16}$-$t_{17}$): as shown in FIG. 6k, both a grid voltage and a grid-in current are in a negative half-cycle; power switches $S_3$, $S_4$ and $S_5$ are in the on-state, and the grid-in current flows through the power switch $S_3$, a second power switch $S_4$ and an inductor $L_2$ into a power grid; and the power switch $S_5$ is in the on-state, but without current flowing. Mode 12 ($t_{17}$-$t_{18}$): as shown in FIG. 6l, both a grid voltage and a grid-in current are in a negative half-cycle; a power switch $S_3$ is in the off-state, and power switches $S_4$ and $S_5$ are in the on-state; a voltage at two ends of the power switch $S_3$ is clamped to half of a DC input voltage; and a current from an inductor $L_2$ is in the freewheeling state, and a freewheeling branch includes the power switch $S_5$ and a power diode $D_{10}$.

FIGS. 7-13 are simulation result diagrams and experimental waveform diagrams under the modulation strategy of the present disclosure. The specific parameters of a simulation example are as follows: DC voltage $U_{PN}$=360 V, grid voltage $U_g$=110 V(rms), grid frequency $f_g$=50 Hz, rated power $P_N$=1 kW; inductor $L_1$=$L_2$=1. 5 mH; and switching frequency $f_s$=16 kHz; and the parameters of an experimental example are the same as those of the simulation example.

Figure 7:
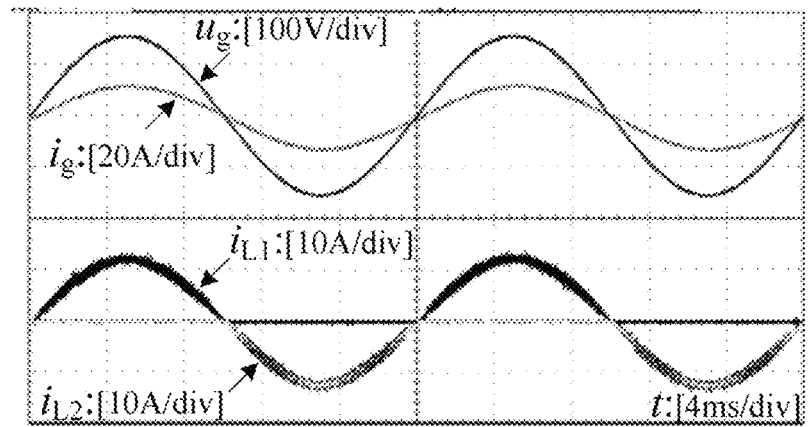
FIG. 7 is an operating current waveform diagram of two inductors in the inverter shown in FIG. 3 under the modulation strategy of the present disclosure.

FIG. 7 is an experimental waveform diagram of an operating current from inductors in the inverter shown in FIG. 3 under the modulation strategy of the present disclosure. As can be seen in FIG. 7, each of the inductors operates for only half cycle of a power grid, that is, in a positive half-cycle and a negative half-cycle of the power grid, and the current from the inductor flows in a unidirectional direction.

Figure 8A:
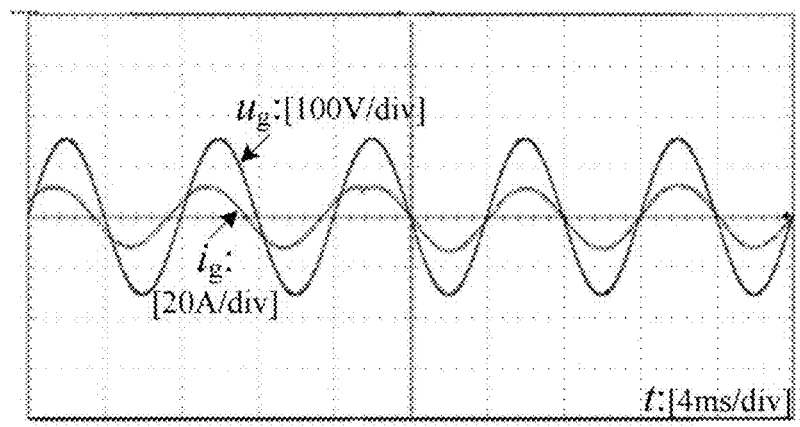
FIG. 8a shows waveform of grid voltage and grid-in current when a PF switches from leading PF to UPF under the modulation strategy of the present disclosure.
Figure 8B:
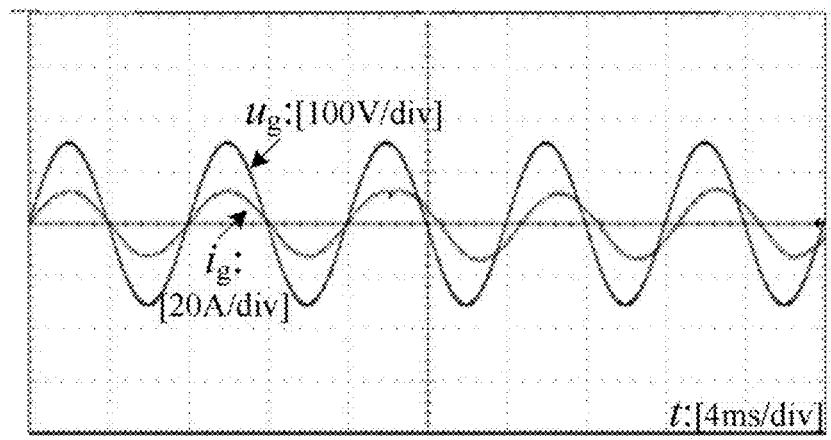
FIG. 8b shows waveform of grid voltage and grid-in current when the PF switches from UPF to lagging PF under the modulation strategy of the present disclosure.

FIGS. 8a-8b are experimental waveform diagrams of the inverter shown in FIG. 3 in a case of operating and switching at different PFs under the modulation strategy of the present disclosure. FIG. 8a shows waveform of grid voltage and grid-in current in a case that a leading PF is switched to a UPF, with a PF jumping from the leading PF 0.866 to 1. FIG. 8b shows waveform of grid voltage and grid-in current in a case that a UPF is switched to a lagging PF, with a PF jumping from 1 to a lagging PF 0. 866. From FIGS. 8a-8b, it can be seen that under the modulation strategy of the present disclosure, the inverter can stably operate and instantaneously switch between UPF and NUPF, and has reactive power output operation capability.

Figure 9A:
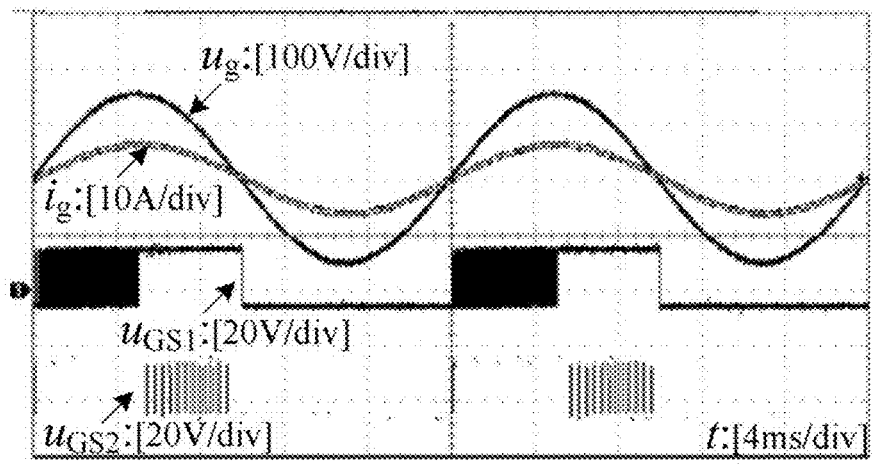
FIG. 9a shows experimental waveform of drive signals of power switches under UPF using the modulation strategy of the present disclosure.
Figure 9B:
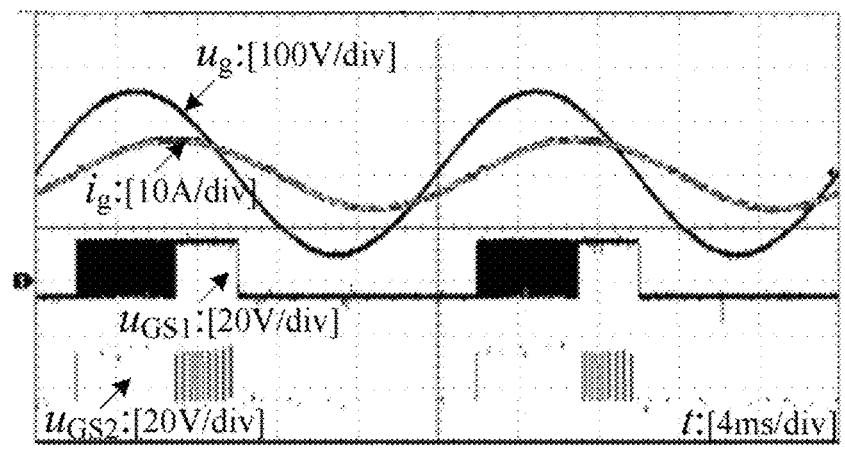
FIG. 9b displays experimental waveform of drive signals of power switches under lagging PF using the modulation strategy of the present disclosure.

FIGS. 9a-9b show the results of loss distribution of power switches and power diodes for the inverter shown in FIG. 3 at different PF angles with given simulation example parameters under an OOZ modulation strategy. FIG. 9a shows the loss distribution at UPF, and FIG. 9b shows the loss distribution in a case that a grid-in current lags the grid voltage for $\pi/6$. From FIGS. 9a-9b, it can be seen that there is a large difference in the losses of power switches $S_1$ and $S_2$ under the OOZ strategy with the given simulation example parameters.

Figure 10A:
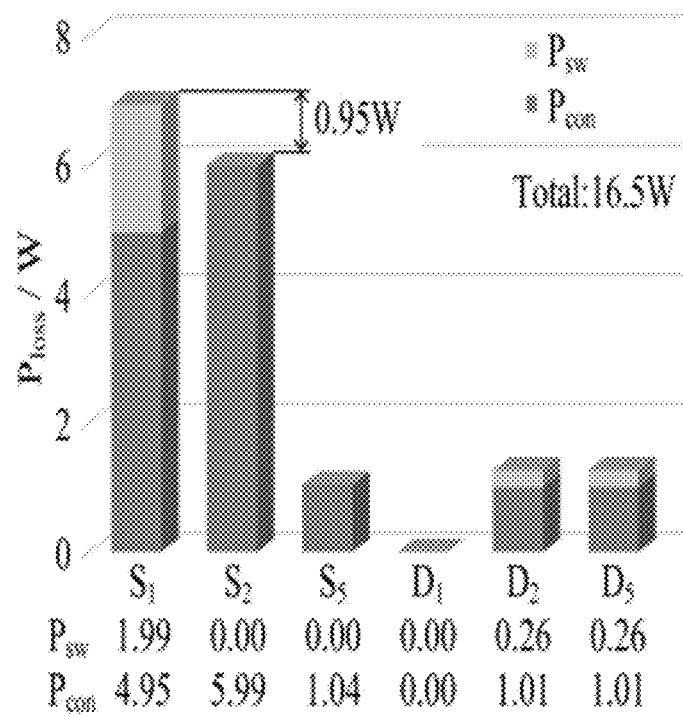
FIG. 10a depicts the distribution of losses in power switches and power diodes under UPF for the inverter illustrated in FIG. 3 using an 00Z modulation strategy.
Figure 10B:
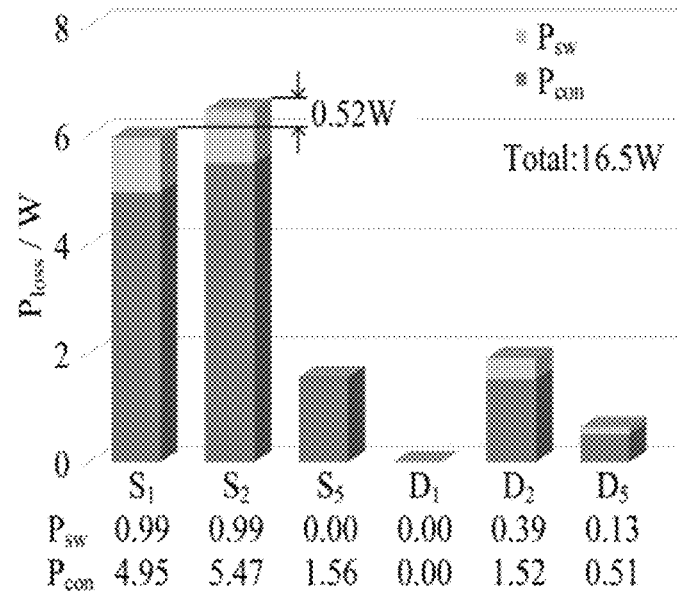
FIG. 10b illustrates the distribution of losses in power switches and power diodes under UPF for the inverter illustrated in FIG. 3 using the modulation strategy of the present disclosure.

FIGS. 10a-10b show the results of the loss distribution of power switches and power diodes for the inverter shown in FIG. 3 at different PF angles with given simulation example parameters under the modulation strategy of the present disclosure. FIG. 10a shows the loss distribution at UPF, and FIG. 10b shows the loss distribution in a case that a grid-in current lags the grid voltage for $\pi/6$. From FIGS. 10a-10b, it can be seen that under the given simulation example parameters, the loss difference between power switches $S_1$ and $S_2$ under the modulation strategy of the present disclosure is significantly improved, and the loss difference is still small under NUPF, which can effectively balance the thermal stresses of the power switches on the inner and outer sides of the bridge arm.

Figure 11A:
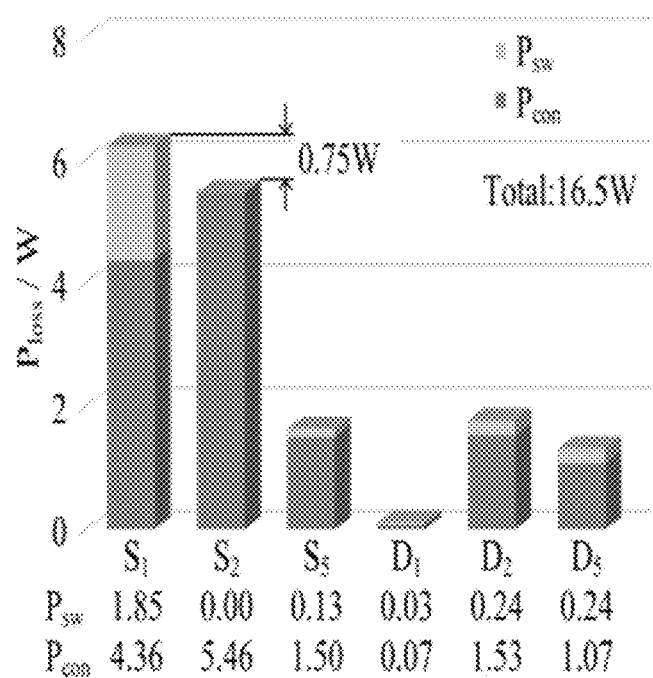
FIG. 11a presents the distribution of losses in power switches and power diodes under lagging PF for the inverter illustrated in FIG. 3 using the 00Z modulation strategy.
Figure 11B:
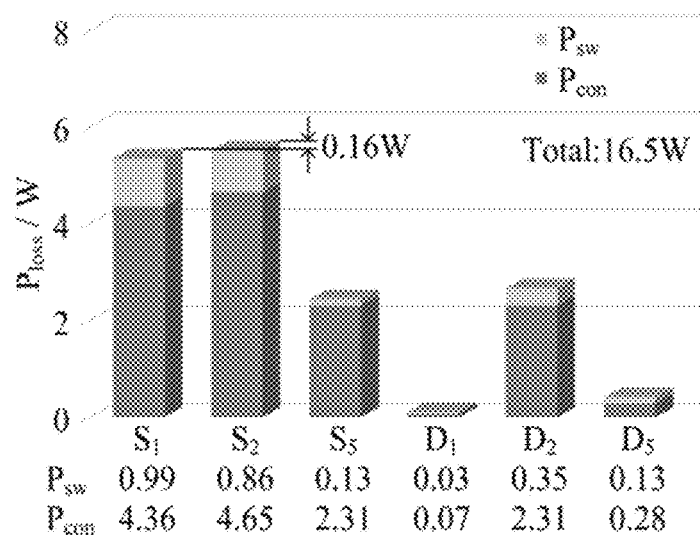
FIG. 11b exhibits the distribution of losses in power switches and power diodes under lagging PF for the inverter illustrated in FIG. 3 using the modulation strategy of the present disclosure.

FIGS. 11a-11b are experimental waveform diagrams of drive signals of power switches at different PF angles under the modulation strategy of the present disclosure. FIG. 11a shows drive signals of power switches $S_1$ and $S_2$ at UPF, and FIG. 11b shows drive signals of power switches $S_1$ and $S_2$ in a case that a grid-in current lags the grid voltage for $\pi/6$. From FIG. 11a, it can be seen that both the power switches $S_1$ and $S_2$ operate at high frequencies in one-quarter of the grid cycle, avoiding that, under the OOZ modulation strategy, only the power switch $S_1$ on the outer side of the bridge arm operates at a high frequency, while the power switch $S_2$ on the inner side of the bridge arm always operates at an insufficient frequency. As can be seen from FIG. 11b, the power switch $S_1$ still operates at a high frequency in one-quarter of the grid cycle, and the power switch $S_2$ has a reduced high-frequency operating interval. A normally on-state time is one-quarter of the grid cycle. The power switch $S_2$ is no longer to be on to freewheel within an inverse region between the grid voltage and the grid-in current.

Figure 12A:
FIG. 12a displays experimental waveform of the thermal performance of power switches $S_1$ and $S_2$ under LPF for the inverter illustrated in FIG. 3 using the 00Z modulation strategy.
Figure 12B:
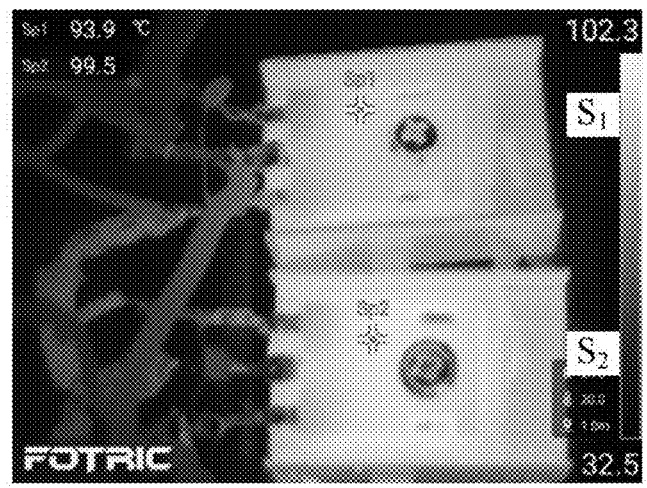
FIG. 12b illustrates experimental waveform of the thermal performance of power switches $S_1$ and $S_2$ under lagging PF for the inverter illustrated in FIG. 3 using the 00Z modulation strategy.

FIGS. 12a-12b are experimental waveform diagrams of the thermal performance of power switches $S_1$ and $S_2$ at different PF angles under the OOZ modulation strategy. From the two figures, it can be seen that a difference of thermal imaging brightness between the power switches on the inner and outer sides of the bridge arm is larger under the OOZ modulation strategy, indicating that a difference between losses of the power switches on the inner and outer sides of the bridge arm is larger under the OOZ modulation strategy.

Figure 13A:
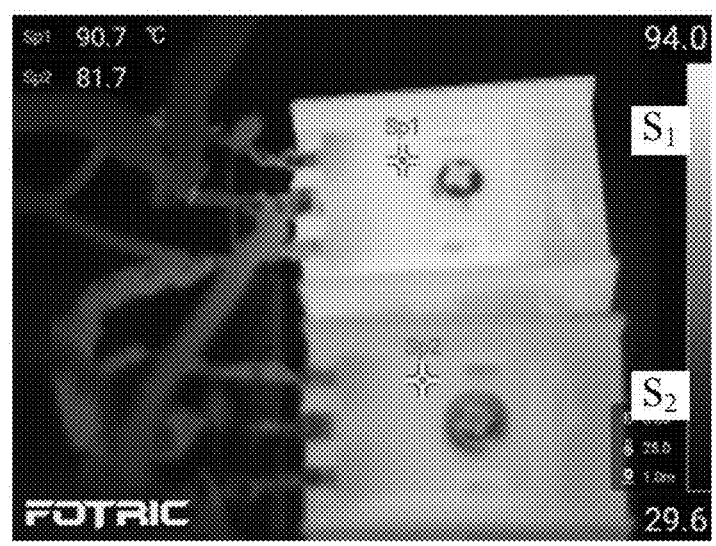
FIG. 13a exhibits experimental waveform of the thermal performance of power switches $S_1$ and $S_2$ under UPF for the inverter illustrated in FIG. 3 using the modulation strategy of the present disclosure.
Figure 13B:
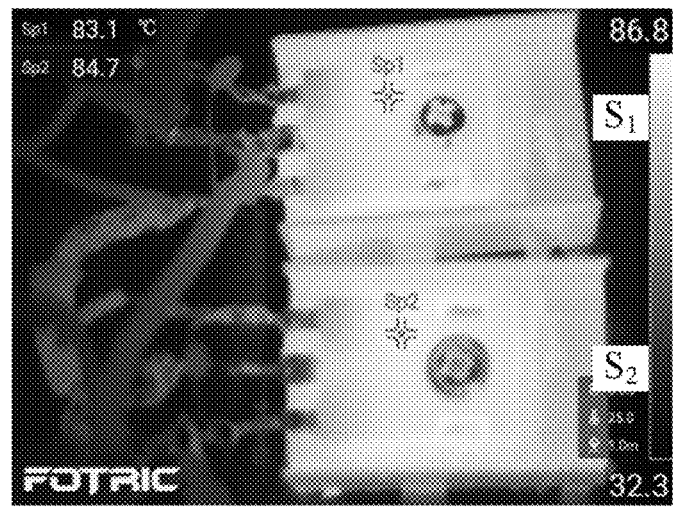
FIG. 13b presents experimental waveform of the thermal performance of power switches $S_1$ and $S_2$ under lagging PF for the inverter illustrated in FIG. 3 using the modulation strategy of the present disclosure.

FIGS. 13a-13b are experimental waveform diagrams of the thermal performance of power switches $S_1$ and $S_2$ at different PF angles under the modulation strategy of the present disclosure. From the two figures, it can be seen that under the modulation strategy of the present disclosure, the color brightness of thermal imaging maps of the power switches is basically the same, indicating that a difference between losses of the power switches on the inner and outer sides of the bridge arm under the modulation strategy of the present disclosure is small, and a junction temperature of the power switches is more balanced.

Table 1 shows junction temperatures of power switches $S_1$, $S_2$, $S_3$ and $S_4$ at different PF angles under the OOZ modulation strategy and under the modulation strategy of the present disclosure and junction temperature differences.

TABLE 1

| | | UPF | | Grid-in current lags the grid voltage for $\pi/6$ | |
|---|---|---|---|---|---|
| | | Junction temperature/° C. | Junction temperature difference/° C. | Junction temperature/° C. | Junction temperature difference/° C. |
| OOZ modulation strategy | $S_1$ | 107.5 | 11.9 | 90.7 | 9 |
| | $S_2$ | 95.6 | | 81.7 | |
| | $S_3$ | 94.3 | 12.1 | 82.3 | 9.2 |
| | $S_4$ | 106.4 | | 91.5 | |
| Modulation strategy of the present disclosure | $S_1$ | 93.9 | 5.6 | 83.1 | 1.6 |
| | $S_2$ | 99.5 | | 84.7 | |
| | $S_3$ | 100.9 | 5.8 | 85.9 | 1 |
| | $S_4$ | 95.1 | | 84.9 | |

From the above table, it can be seen that the junction temperature of power switches under the modulation strategy of the present disclosure is more balanced and the maximum junction temperature is less than that under the OOZ modulation strategy, effectively reducing the thermal stress of devices.

Example 2

Figure 14A:
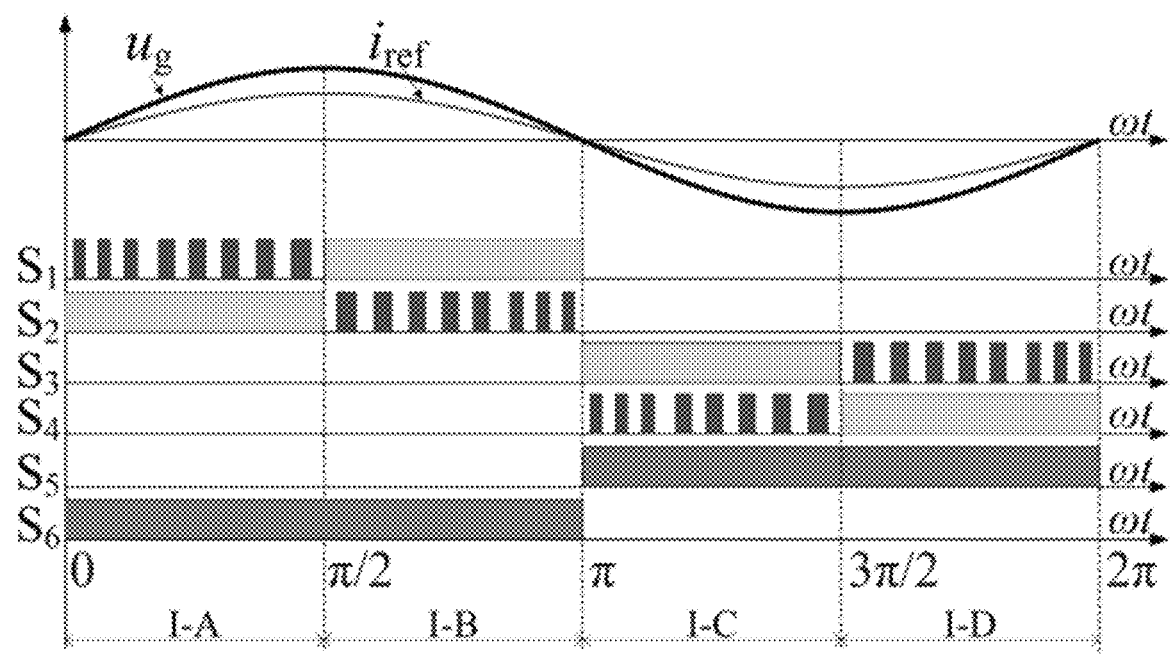
FIG. 14a is a schematic diagram of the modulation style I and modulation regions thereof based on the A-NPC inverter shown in FIG. 2.
Figure 14B:
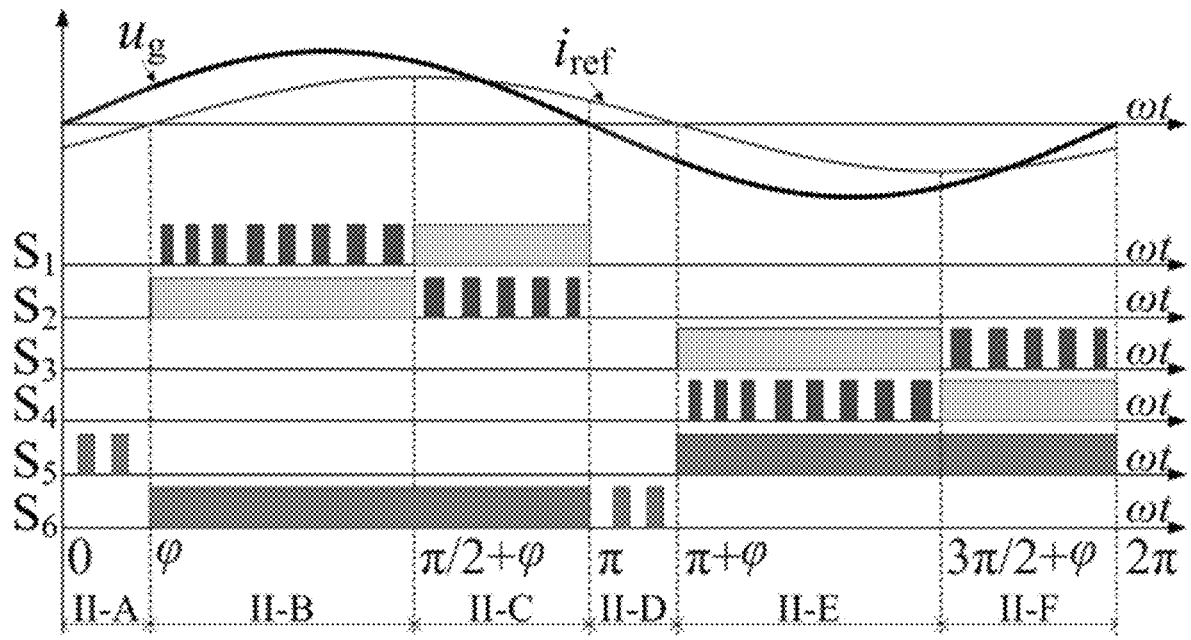
FIG. 14b is a schematic diagram of the modulation style II and modulation regions thereof based on the A-NPC inverter shown in FIG. 2.
Figure 14C:
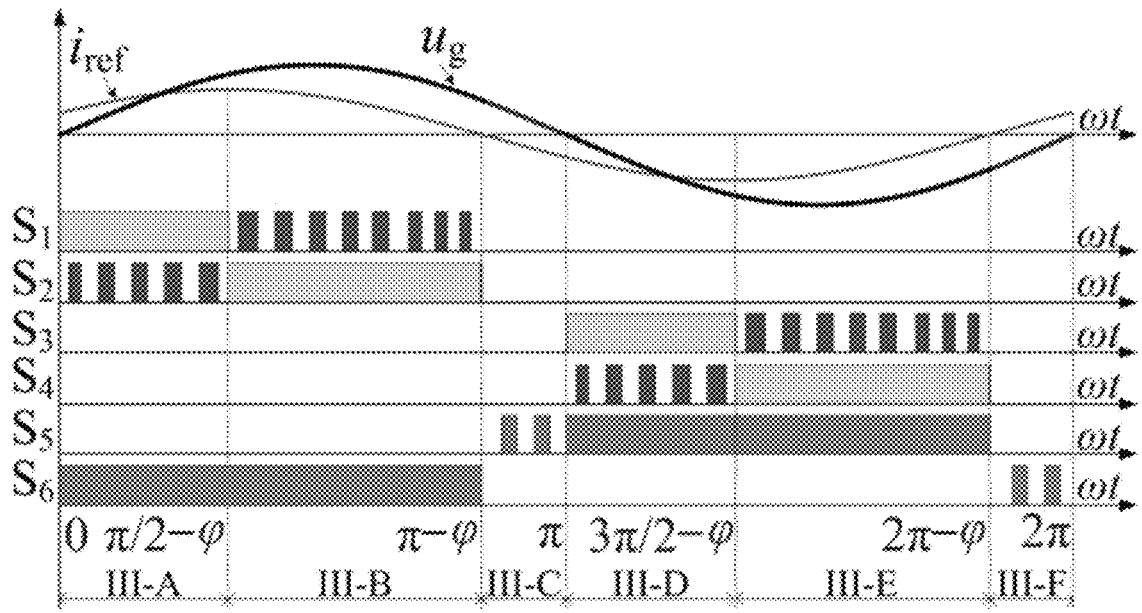
FIG. 14c is a schematic diagram of the modulation style III and modulation regions thereof based on the A-NPC inverter shown in FIG. 2.

FIGS. 14a-14c are schematic diagrams of modulation styles and modulation regions based on a modulation strategy for balancing loss distribution of power switches in an A-NPC inverter shown in FIG. 2 according to the present disclosure.

FIG. 14a is a schematic diagram of a modulation style I and modulation regions thereof. In the modulation style I, drive signals of various power switches are generated as follows. In a region I-A, a power switch $S_1$ operates at a high frequency according to a unipolar SPWM mode, power switches $S_2$ and $S_6$ keep on, and power switches $S_3$, $S_4$ and $S_5$ keep off. In a region I-B, a power switch $S_2$ operates at a high frequency according to the unipolar SPWM mode, power switches $S_1$ and $S_6$ keep on, and power switches $S_3$, $S_4$ and $S_5$ keep off. In a region I-C, a power switch $S_4$ operates at a high frequency according to the unipolar SPWM mode, power switches $S_3$ and $S_5$ keep on, and power switches $S_1$, $S_2$ and $S_6$ keep off. In a region I-D, a power switch $S_3$ operates at a high frequency according to the unipolar SPWM mode, power switches $S_4$ and $S_5$ keep on, and power switches $S_1$, $S_2$ and $S_6$ keep off.

FIG. 14b is a schematic diagram of a modulation style II and modulation regions thereof. In the modulation style II, drive signals of various power switches are generated as follows. In a region II-A, a power switch $S_5$ operates at a high frequency according to a unipolar SPWM mode, and the remaining power switches keep off. In a region II-B, a power switch $S_1$ operates at a high frequency according to the unipolar SPWM mode, power switches $S_2$ and $S_6$ keep on, and power switches $S_3$, $S_4$ and $S_5$ keep off. In a region II-C, a power switch $S_2$ operates at a high frequency according to the unipolar SPWM mode, power switches $S_1$ and $S_6$ keep on, and power switches $S_3$, $S_4$ and $S_5$ keep off. In a region II-D, a power switch $S_6$ operates at a high frequency according to the unipolar SPWM mode, and the remaining power switches keep off. In a region II-E, a power switch $S_4$ operates at a high frequency according to the unipolar SPWM mode, power switches $S_3$ and $S_5$ keep on, and power switches $S_1$, $S_2$ and $S_6$ keep off. In a region II-F, a power switch S3 operates at a high frequency according to the unipolar SPWM mode, power switches $S_4$ and $S_5$ keep on, and power switches $S_1$, $S_2$ and $S_6$ keep off.

FIG. 14c is a schematic diagram of a modulation style III and modulation regions thereof. In the modulation style III, drive signals of various power switches are generated as follows. In a region III-A, a power switch $S_2$ operates at a high frequency according to a unipolar SPWM mode, power switches $S_1$ and $S_6$ keep on, and power switches $S_3$, $S_4$ and $S_5$ keep off. In a region III-B, a power switch $S_1$ operates at a high frequency according to the unipolar SPWM mode, power switches $S_2$ and $S_6$ keep on, and power switches $S_3$, $S_4$ and $S_5$ keep off. In a region III-C, a power switch $S_5$ operates at a high frequency according to the unipolar SPWM mode, and the remaining power switches keep off. In a region III-D, a power switch $S_4$ operates at a high frequency according to the unipolar SPWM mode, power switches $S_3$ and $S_5$ keep on, and power switches $S_1$, $S_2$ and $S_6$ keep off. In a region III-E, a power switch $S_3$ operates at a high frequency according to the unipolar SPWM mode, power switches $S_4$ and $S_5$ keep on, and power switches $S_1$, $S_2$ and $S_6$ keep off. In a region III-F, a power switch $S_6$ operates at a high frequency according to the unipolar SPWM mode, and the remaining power switches keep off.

After experiment and simulation results are outputted, it can be known that a junction temperature of the power switches is more balanced under the modulation strategy of the example, effectively reducing the thermal stress of devices.

It is to be noted that the contents described above only illustrate the technical ideas of the present disclosure, and cannot be used to limit the scope of protection of the present disclosure. For those ordinary skilled in the art, several improvements and embellishments can be made without departing from the principle of the present disclosure, all of which fall within the protection scope of claims of the present disclosure.

The invention claimed is:

1. An implementation method for a modulation strategy used for balancing losses of power switches in a bridge arm of a neutral point clamped three level inverter, comprising the steps of:

S1: determining a power factor (PF) angle $\varphi$;

S2: determining an operation type of the neutral point clamped three level inverter according to the PF angle $\varphi$, and selecting a corresponding modulation style, the operation type comprising a unity power factor (UPF) operation, a lagging PF operation, and a leading PF operation, corresponding to a modulation style I, a modulation style II, and a modulation style III, respectively;

S3: determining a corresponding modulation region according to the PF angle $\varphi$ obtained in step S1, the modulation style obtained in step S2, and a grid phase angle $\theta$, wherein the modulation style I selectively corresponds to modulation regions I-A, I-B, I-C and I-D; and in the modulation style I, a corresponding modulation region is I-A in a case that the grid phase angle $\theta$ and the PF angle $\varphi$ meet $0 \leq \theta < \pi/2$, a corresponding modulation region is I-B in a case that $\pi/2 \leq \theta < \pi$, a corresponding modulation region is I-C in a case that $\pi \leq \theta < 3\pi/2$, and a corresponding modulation region is I-D in a case that $3\pi/2 \leq \theta < 2\pi$;

the modulation style II selectively corresponds to modulation regions II-A, II-B, II-C, II-D, II-E and II-F; and in the modulation style II, a corresponding modulation region is II-A in a case that the grid phase angle $\theta$ and the PF angle $\varphi$ meet $0 \leq \theta < \varphi$, a corresponding modulation region is II-B in a case that $\varphi \leq \theta < \varphi + \pi/2$, a corresponding modulation region is II-C in a case that $\varphi + \eta/2 \leq \theta < \pi$, a corresponding modulation region is II-D in a case that $\pi \leq \theta < \varphi + \pi$, a corresponding modulation region is II-E in a case that $\varphi + \pi \leq \theta < \varphi + 3\pi/2$, and a corresponding modulation region is II-F in a case that $\varphi + 3\pi/2 \leq \theta < 2\pi$; and the modulation style III selectively corresponds to modulation regions III-A, III-B, III-C, III-D, III-E, and III-F; and in the modulation style III, a corresponding modulation region is III-A in a case that the grid phase angle $\theta$ and the PF angle $\varphi$ meet $0 \leq \theta < \pi/2 - \varphi$, a corresponding modulation region is III-B in a case that $\pi/2 - \varphi \leq \theta < \pi - \varphi$, a corresponding modulation region is III-C in a case that $\pi - \varphi \leq \theta < \pi$, a corresponding modulation region is III-D in a case that $\pi \leq \theta < 3\pi/2 - \varphi$, a corresponding modulation region is III-E in a case that $3\pi/2 - \varphi \leq \theta < 2\pi - \varphi$, and a corresponding modulation region is III-F in a case that $2\pi - \varphi \leq \theta < 2\pi$; and S4: outputting drive signals of various power switches according to the modulation regions to balance switching losses of inner and outer sides of the bridge arm of the neutral point clamped three level inverter, wherein in a case that the modulation style I is selected, in the region I-A, a power switch ($S_1$) of the bridge arm operates at a high frequency according to a unipolar sinusoidal pulse width modulation (SPWM) mode, power switches ($S_2$, $S_6$) of the bridge arm are turned on, and power switches (S3, $S_4$, $S_5$) of the bridge arm are turned off;

in the region I-B, a power switch ($S_2$) of the bridge arm operates at the high frequency according to the unipolar SPWM mode, power switches ($S_1$, $S_6$) of the bridge arm are turned on, and power switches ($S_3$, $S_4$, $S_5$) of the bridge arm are turned off;

in the region I-C, a power switch ($S_4$) of the bridge arm operates at the high frequency according to the unipolar SPWM mode, power switches ($S_3$, $S_5$) of the bridge arm are turned on, and power switches ($S_1$, $S_2$, $S_6$) of the bridge arm are turned off; and in the region I-D, a power switch ($S_3$) of the bridge arm operates at the high frequency according to the unipolar SPWM mode, power switches ($S_4$, $S_5$) of the bridge arm are turned on, and power switches ($S_1$, $S_2$, $S_6$) of the bridge arm are turned off;

in a case that the modulation style II is selected, in the region II-A, a power switch ($S_5$) of the bridge arm operates at a high frequency according to a unipolar SPWM mode, and the remaining power switches of the bridge arm are turned off;

in the region II-B, a power switch ($S_1$) of the bridge arm operates at the high frequency according to the unipolar SPWM mode, power switches ($S_2$, $S_6$) of the bridge arm are turned on, and power switches ($S_3$, $S_4$, $S_5$) of the bridge arm are turned off;

in the region II-C, a power switch ($S_2$) of the bridge arm operates at the high frequency according to the unipolar SPWM mode, power switches ($S_1$, $S_6$) of the bridge arm are turned on, and power switches ($S_3$, $S_4$, $S_5$) of the bridge arm are turned off;

in the region II-D, a power switch ($S_6$) of the bridge arm operates at the high frequency according to the unipolar SPWM mode, and the remaining power switches of the bridge arm are turned off;

in the region II-E, a power switch ($S_4$) of the bridge arm operates at the high frequency according to the unipolar SPWM mode, power switches ($S_3$, $S_5$) of the bridge arm are turned on, and power switches ($S_1$, $S_2$, $S_6$) of the bridge arm are turned off; and in the region II-F, a power switch ($S_3$) of the bridge arm operates at the high frequency according to the unipolar SPWM mode, power switches ($S_4$, $S_5$) of the bridge arm are turned on, and power switches ($S_1$, $S_2$, $S_6$) of the bridge arm are turned off; and in a case that the modulation style III is selected, in the region III-A, a power switch ($S_2$) of the bridge arm operates at a high frequency according to a unipolar SPWM mode, power switches ($S_1$, $S_6$) of the bridge arm are turned on, and power switches ($S_3$, $S_4$, $S_5$) of the bridge arm are turned off;

in the region III-B, a power switch ($S_1$) of the bridge arm operates at the high frequency according to the unipolar SPWM mode, power switches ($S_2$, $S_6$) of the bridge arm are turned on, and power switches ($S_3$, $S_4$, $S_5$) of the bridge arm are turned off;

in the region III-C, a power switch ($S_5$) of the bridge arm operates at the high frequency according to the unipolar SPWM mode, and the remaining power switches of the bridge arm are turned off;

in the region III-D, a power switch ($S_4$) of the bridge arm operates at the high frequency according to the unipolar SPWM mode, power switches ($S_3$, $S_5$) of the bridge arm are turned on, and power switches ($S_1$, $S_2$, $S_6$) of the bridge arm are turned off;

in the region III-E, a power switch ($S_3$) of the bridge arm operates at the high frequency according to the unipolar SPWM mode, power switches ($S_4$, $S_5$) of the bridge arm are turned on, and power switches ($S_1$, $S_2$, $S_6$) of the bridge arm are turned off; and in the region III-F, a power switch ($S_6$) of the bridge arm operates at the high frequency according to the unipolar SPWM mode, and the remaining power switches of the bridge arm are turned off, wherein in step 2, in a case that the PF angle φ is zero, the neutral point clamped three level inverter is in the UPF operation, corresponding to the modulation style I; in a case that the PF angle φ is greater than zero, the neutral point clamped three level inverter is in the lagging PF operation, corresponding to the modulation style II; and in a case that the PF angle φ is less than zero, the neutral point clamped three level inverter is in the leading PF operation, corresponding to the modulation style III, and wherein the drive signals of various power switches in step S4 are obtained by comparing a modulation wave $V_m$ with a carrier wave $V_c$ according to unipolar SPWM.

* * * * *